(12) United States Patent
Buchanan

(10) Patent No.: US 11,453,103 B2
(45) Date of Patent: Sep. 27, 2022

(54) LOCKING CLUTCH RATCHET WRENCHES

(71) Applicant: Nigel Buchanan, Fife (GB)

(72) Inventor: Nigel Buchanan, Fife (GB)

( * ) Notice: Subject to any disclaimer, the term of this patent is extended or adjusted under 35 U.S.C. 154(b) by 0 days.

(21) Appl. No.: 16/775,951

(22) Filed: Jan. 29, 2020

(65) Prior Publication Data
US 2020/0223036 A1  Jul. 16, 2020

Related U.S. Application Data

(63) Continuation of application No. 15/773,747, filed on May 4, 2018, now abandoned.

(51) Int. Cl.
*B25B 13/46* (2006.01)
*F16D 41/06* (2006.01)
*B25G 1/06* (2006.01)

(52) U.S. Cl.
CPC ........... *B25B 13/462* (2013.01); *B25G 1/066* (2013.01); *F16D 41/06* (2013.01); *F16D 2041/0603* (2013.01)

(58) Field of Classification Search
CPC ... B25B 13/461; B25B 13/462; B25B 13/463; B25B 13/465; B25B 13/46; B25B 13/04; B25B 13/065
USPC .................................. 81/59.1, 58.3, 58.4, 60
See application file for complete search history.

(56) References Cited

U.S. PATENT DOCUMENTS

| | | | |
|---|---|---|---|
| 2,542,323 A * | 2/1951 | Gearhart | B25B 13/465 192/43 |
| 4,491,043 A * | 1/1985 | Dempsey | B25B 13/462 81/58 |
| 5,351,583 A * | 10/1994 | Szymber | B25B 13/466 81/59.1 |
| 5,626,061 A * | 5/1997 | Whitley | B25B 23/16 81/63 |
| 8,671,808 B2 * | 3/2014 | Huang | B25B 23/0028 81/177.75 |

(Continued)

FOREIGN PATENT DOCUMENTS

| | | | |
|---|---|---|---|
| DE | 202012104590 U1 | 5/2013 | |
| FR | 598783 A | 12/1925 | |

(Continued)

OTHER PUBLICATIONS

International Search Report for corresponding International application No. PCT/GB2016/053445, dated Feb. 20, 2017, 2 pages.

(Continued)

*Primary Examiner* — Lee D Wilson
*Assistant Examiner* — Robert F Neibaur
(74) *Attorney, Agent, or Firm* — Patterson Intellectual Property Law, PC; Emily A. Shouse

(57) ABSTRACT

A locking clutch ratchet wrench (1) is configured such that a clutch ring (500) forms the mid part of aminate like structure. Under torque applying conditions, the compression forces applied to the clutch ring (500) are substantially dissipated around the circumference (507) of the clutch ring. This inwardly directed force clamp against the inherently strong outer surface 405 of the drive element (400). The resultant pseudo laminate structure of the drive element (400), clutch (500) and housing (201, 202) enables the construction of a proportionately stronger ratchet wrench of reduced height or width.

19 Claims, 22 Drawing Sheets

(56) References Cited

U.S. PATENT DOCUMENTS

2005/0115366 A1 6/2005 Chaconas
2013/0340574 A1 12/2013 Buchanan

FOREIGN PATENT DOCUMENTS

GB          648163 A   12/1950
GB         2399782 A    9/2004

OTHER PUBLICATIONS

International Search Report for corresponding International application No. PCT/GB2016/053460, dated Feb. 20, 2017, 2 pages.
International Search Report for corresponding International application No. PCT/GB2016/053437, dated Feb. 20, 2017, 2 pages.
International Search Report for corresponding International application No. PCT/GB2016/053461, dated Feb. 20, 2017, 2 pages.

* cited by examiner

LOCKING CLUTCH RATCHET WRENCHES

FIELD OF THE INVENTION

The invention relates to wrench ratchet mechanisms and wrenches (often referred to in the United Kingdom as spanners), also roller or sprag clutches used as one way mechanisms or selective circular drives.

BACKGROUND TO THE INVENTION

Known ratchet wrenches may comprise a wrench head that houses a driven member. The driven member may be provided with an aperture shaped to receive an item that is to be driven. For example, the aperture may be a hexagonal aperture sized to receive a particular size of fastener head/nut. Alternatively, the driven member may comprise a spigot that projects from the wrench head to allow the wrench head to be connected to a drive socket or the like. A resilient annular clutch may be disposed between the wrench head and driven member to transmit an applied torque from the wrench head to the driven member. When the wrench handle is turned in the drive direction to apply a torque to a fastener of the like, the clutch is deformed to lock the wrench head to the driven member to transmit the torque. When the wrench handle is turned in the opposite direction, the clutch springs back to allow relative movement of the wrench head and driven member to all repositioning of the wrench handle.

In order to avoid having an overly large wrench head, the resilient annular clutch may be a relatively thin sprung ring, which when subjected to repeated high torques is deformed to such an extent it becomes ineffective.

The annular clutch may have a series of fine teeth on its outer side to engage correspondingly fine teeth on the wrench head. There may for example be at least one hundred teeth on the annular clutch. Since such teeth are relatively fine, even a small amount of deformation of the annular clutch, for example as little as 0.01% makes it particularly likely to fail properly engage the teeth on the wrench head. Manufacturing a relatively thin annular clutch with fine teeth is not straightforward. One potential manufacturing method is metal injection moulding MIM.

MIM parts are moulded from metal particles held together with a percentage of plasticiser or wax. The moulded parts are subjected to a very high temperature in a vacuum oven during which the metal particles fuse and the plasticiser is burnt and vacuumed off. Even differences as small as 0.02% in the process produces variations in the finished size that may cause misalignment of the teeth when the annular clutch ring is forced into engagement with the wrench head.

A further problem with such ratchet wrenches is that the ingress of fine dust or grit quickly fouls the ratchet mechanism.

It is an object of the present invention to at least partially alleviate the above mentioned problems, or to provide an alternative to existing products. Embodiments of the invention may provide a thinner profiled more cost effective and reliable product.

SUMMARY OF THE INVENTION

The invention provides a locking clutch ratchet wrench as specified in claim 1.

The invention also includes a locking clutch ratchet wrench as specified in claim 17.

The invention also includes a locking clutch ratchet wrench as specified in claim 18.

The levered end of the handle has, in one iteration a biasing profile for interaction with at least one spring and ball detent, the sprung detent acting to provide a direction bias and the initial grip in the required drive direction of the clutch ring upon the central drive. In the devices rest position the partially compressed springs transmit their resilient force via the detent balls and handle levered end actuator to the clutch ring in order to provide the necessary initial clamping of the clutch ring and to obviate any slack or play inherent in normal ratchets. The clutch portion having a generally smooth inner surface with in best practice a series of gripping notches recessed into the said inner surface and an outer surface with ramp like protrusions corresponding to like ramps within the inner surface of the housing. When the handle or drive shaft is further operated in the drive or locking direction the partially notched and smooth inner surface of the clutch having initially resiliently clamped the corresponding smooth profile of the circumferential surface of the driven member in order that when additional torque is applied in the drive direction to the handle portion or drive shaft the said clutch portion is further urged inwards as the clutch ramp protrusions usefully engage the corresponding inner housing ramps, further propelling the inner surface of the clutch ring inwards upon the outer surface of the central drive portion enabling the engaged fastener to be robustly driven. In order to optimise the clutches initial inner surface grip upon the corresponding drive portion the notches have only small radiuses on their edges in order to provide gripping leading edges.

When the handle is operated in the reverse or reposition direction the actuator releases its initial or direction biasing force against the abutting clutch actuation face alleviating the biasing springs resilient force partially freeing the clutch inner surface from the drive portion. The action of the drive portion being rotated against any clamping friction of the clutch ring further rotates the clutch outer ramps away from the corresponding housing ramps allowing the clutch ring to expand further negating the grip of the clutch ring upon the driven member drive surface usefully allowing the drive portion or shaft to be reversed or repositioned. The magnitude of the clutch engaging spring force is directionally proportionate to that of the detent resilient portion, to that end the clutch ring generally requires to be thin in section and made from resilient material like high grade spring steel. The device is designed such that the clutch ring forms the mid part of an extremely strong laminate like structure, under torque conditions the resultant compression forces applied substantially equally to the clutch ring outer surface are substantially dissipated around its inner surface upon the drive portion periphery. The resultant pseudo laminate like construction of the drive, clutch and housing enables a proportionately far stronger or alternately a thinner lighter device.

In order to optimise the clutch's inner surface grip upon the corresponding drive portion outer circumference, slots or recesses may be incorporated into either the clutch drive surface or the drive portion outer surface the corresponding surface being substantially smooth. These recesses have at least one leading edge which advantageously enhances the opposing surfaces grip upon each other resulting in a far greater torque transmission capability or at least enabling the reduction of the size of the head portion. The leading edge of the slot, may promote a cleaning function upon the opposing surface. Any debris collected can then be conveniently stored within the slot recess until such time as the device is serviced.

In order to cut the manufacturing costs to a minimum, the gripping slots or recesses may be incorporated into the inner surface of the clutch ring. If the clutch ring is manufactured using a procedure like metal injection moulding MIM and the slots are moulded in, there is no need for any further expensive machining of the smooth drive outer surface, thereby lowering the production costs and improving the manufacturing times.

Some embodiments may be utilised as a safety device in that the maximum torque level that can be transmitted can be calculated, the most important computation being the cross-sectional area of the gripping surfaces of the clutch inner surface upon the drive circumferential surface and the amount of recesses utilized. Once verified the maximum torque set can be utilized to prevent undue torque being applied to the mechanism. The mechanism retaining its maximum torque threshold despite repeated overloads.

If the clutch inner surface is smooth, the outer radiuses of the drive teeth can have minimal radius whereby their locking engagement with the smooth section of the inner sidewall of the clutch ring will be measureably enhanced.

If the drive outer surface is smooth and the clutch ring inner surface is only partially toothed or notched, the optimum placement of the clutch toothed portion is at or near the clutch tail portion outer surface. In use the tail portion at the end with the actuator engagement provides the initial clutch engagement with the drive teeth, the remainder of the clutch ring being pulled from that point around the drive smooth portion periphery by the clutch ramps further engagement with the housing ramps providing the optimum locking engagement of the clutch inner surface and the drive outer surface.

The housing ramps and respective clutch transmission ramps may be configured to ensure that they cannot completely disengage from one another when the ratchet wrench is reverse rotated.

In order to achieve utmost drive smooth portion contact with the notched inner sidewall of the clutch, it is desirable that the innermost circumferential profile of both the toothed or notched section and smooth section of the clutch sidewall are identical. To that end the clutches inner smooth section profile is substantially the same as the inner height of the teeth of the notched or toothed section.

When the wrench head is turned to apply a drive torque, the initial engagement between the notched section of the clutch ring and the smooth outer wall of the drive element may cause the clutch ring outer sidewall ramps to engage the respective housing ramps to urge the clutch ring inwards to engage the notched and smooth sections of the inner sidewall of the clutch with the facing outer sidewall smooth surface of the drive element.

If the drive element is toothed and the clutch ring inner surface is smooth, the tips of the drive teeth may have minimal radiuses whereby locking engagement with the smooth section of the inner sidewall of the clutch will be measurably enhanced.

The operating angles of the housing ramps and the clutch transmission ramps may be between eight and 30 degrees.

The parts of the wrench head are constructed in a quasi-laminate manner. This structure provides an inherently stronger mechanism thus permitting superior torque and useful head size reduction. Laminates are inherently stronger than similar thickness materials due to the utilisation of using metal grain structures in dissimilar grain directions (cross grain).

A match between the clutch notched portions and the clutch smooth portions profiles as they contact the drive outer smooth profile when operated in the drive direction may ensure a pseudo laminate-like construction. The housing ramps also matching the transmission ramps in a similar manner, the role of the drive ramps is to equalize the compression and stresses imparted upon the clutch and drive element in an inward direction i.e. compression in the drive direction. When the ratchet is operated in the reverse or reposition direction, the initial resilient clutch grip upon the drive element causes the clutch transmission ramps to move down the housing ramps within the confines of the housing ramp walls and the clutch transmission ramps, permitting clutch ring expansion into the gap created between the housing and clutch ramps, which provides delamination during the reverse rotation. This allows the now lightly engaged notched inner surface portion of the clutch ring to effortlessly traverse over the drive smooth outer surface.

The wrench head height/thickness may be thin allowing the operation of the ratchet wrench in situations unavailable to other ratchets, whilst still passing the relevant torque standards.

At rest, the clutch inner notched portion is already biased onto the corresponding drive outer surface by detent a spring biased detent in order to provide as far as possible instantaneous engagement between the clutch inner surface and the drive outer surface.

In some embodiments, the handle is affixed the wrench head and a direction switch is biased by a rotational switch biasing protrusion.

The strength of the wrench head may be enhanced by the use of protrusions and recesses placed strategically around the housing aperture. The protrusions or their corresponding recesses can be on either housing face, fitting snugly into one another they provide the housing with the ability to be substantially reduced in profile yet retain strength and robustness.

The strength of the wrench head may be enhanced by the fact that the main locking forces are directed inwards upon the extremely strong drive element circumference, reducing the need for thick housing walls.

The wrench head may comprise the top and bottom housing portions are secured to one another by a snap ring type retainer within a retaining clip channel within the drive element. The drive element may also have a retaining flange.

Alternatively, or additionally, the top and bottom housing portions may be secured to one another by a rivet upstands incorporated within the top or bottom housing portions, the opposing housing portion having a countersunk hole for the retention of the rivet head profile. By incorporating the rivet fixing within the housing moulding and thereby virtually obviating the chance of a separate rivet or screw coming loose from the head portion, the device is ideal for use in the aerospace industry as the incidence of foreign objects being left in problem areas is further reduced.

The top and bottom housing portions, the clutch ring and the drive element are ideal for production using by metal injection moulding MIM. This process allows the parts to be mass produced in great numbers with great precision. The clutch ring thickness can be 0.5 mm in section at its thinnest yet remain accurate.

To further reduce costs and inventory, the top and bottom housing portions may be produced as mirror images of one another. One side of the housing may have housing closure holes and the other side may have corresponding housing closure protrusions, one exactly fitting into the other. The fixings may be by rivets within countersunk holes, the rivets having centre holes for the ease of precision splaying.

The clutch ring has its actuation faces on the opposite end portions, whereby the clutch ring is pulled around the housing inner surface in the first instance, and not pushed.

To protect the interior of the ratchet mechanism from dirt and debris, the housing may incorporate a retaining profile for the retention of dust seals made from flexible material such as silicon rubber.

In order to further reduce its overall working depth, the drive spigot can be of a reduced height compared to standard or prior art spigots. The use of compatible low profile sockets would greatly increase usability in areas of restricted access.

The wrench head can be configured as a ratcheting box wrench in various sizes as required. This allows use on fasteners in a more efficient way as the inherent reduction in play between reverse and drive can be reduced by 20% in normal use.

The drive element may incorporate at least one spring, ball and ball retainer that can usefully interact with the notches or slots incorporated into the clutch inner surface in order to produce a "clicking noise", which informs the operator that the ratchet function is indeed happening when the wrench head is used in blind areas.

The clutch ring may comprise multiple height sections in order to ensure the circumferential flexibility of the clutch ring.

The wrench head width for a ½ inch square drive may be less than 29 mm.

The wrench head width for a ½ inch square drive may be less than 26 mm.

The wrench head width for a ⅜ inch square drive may be less than 25 mm.

The wrench head, width for a ⅜ inch square drive may be less than 22 mm.

Some embodiments may be used as a safety device for such as lawn mowers wherein when the rotating cutter hits an object like a stone, which can cause damage to the engine or gear train. The use of a shear bolt or similar does the job but involves the fitment of a new bolt and the resultant down time, whereas the use of the locking clutch ratchet wrench to drive the cutter only necessitates the removal of the obstacle.

BRIEF DESCRIPTION OF THE DRAWINGS in order that the invention may be well understood, some embodiments, given by way of example only, will be described with reference to the drawings, in which.

DETAILED DESCRIPTION

The drawings are not necessarily to scale, some features may be exaggerated to show details of particular components. Therefore, specific structural and functional details disclosed herein are not to be interpreted as being limiting, but merely as a basis for the claims.

Figure 1:
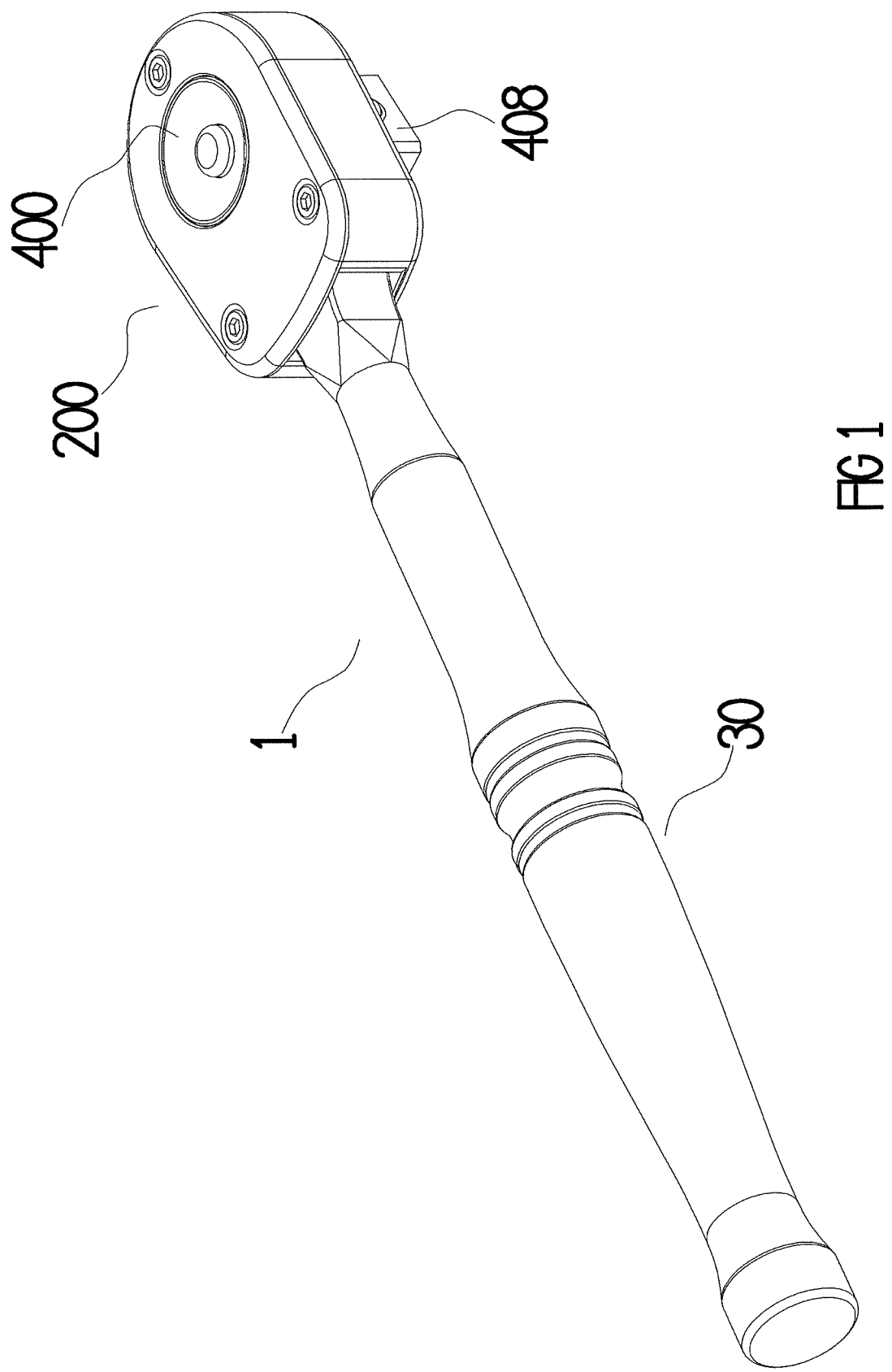
FIG. 1 is a perspective view of the locking clutch ratchet wrench.

FIG. 1 illustrates an embodiment of a locking clutch ratchet wrench 1, denoting a handle portion 30 at one end and a head portion 200 with a drive element 400 and drive spigot 408 at the other end. The said ratchet wrench 1 is at rest.

Figure 2:
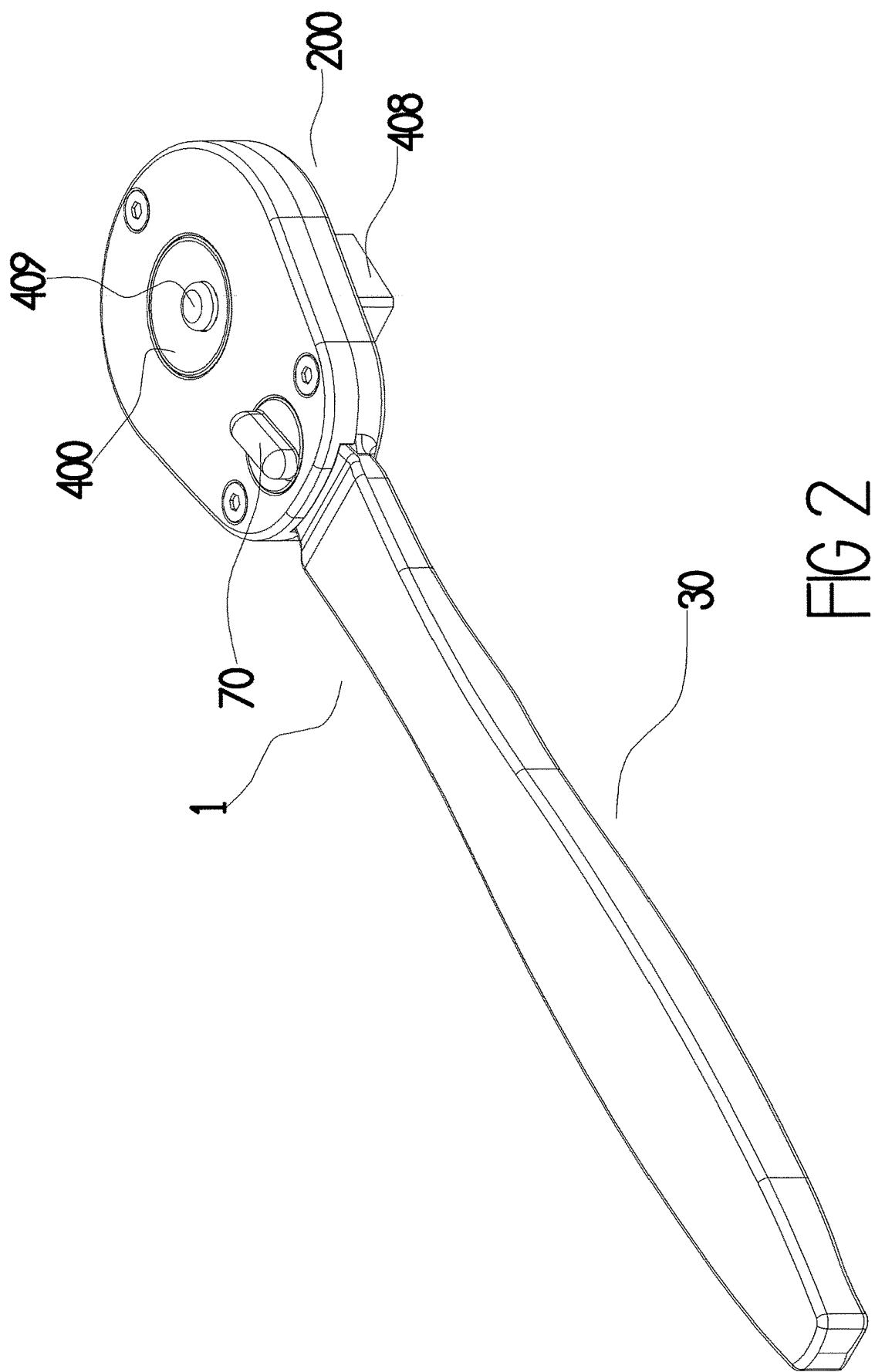
FIG. 2 is a perspective view of the locking clutch ratchet wrench with a switch.

FIG. 2 illustrates a further embodiment of a locking clutch ratchet wrench 1, wherein the drive direction D is effected by a switch 70, denoting the said handle portion 30 at one end and the said head portion 200 with a said central drive element 400 with its push button release 409 and said spigot 408 at the other end. The said ratchet 1 is shown is at rest.

Figure 3:
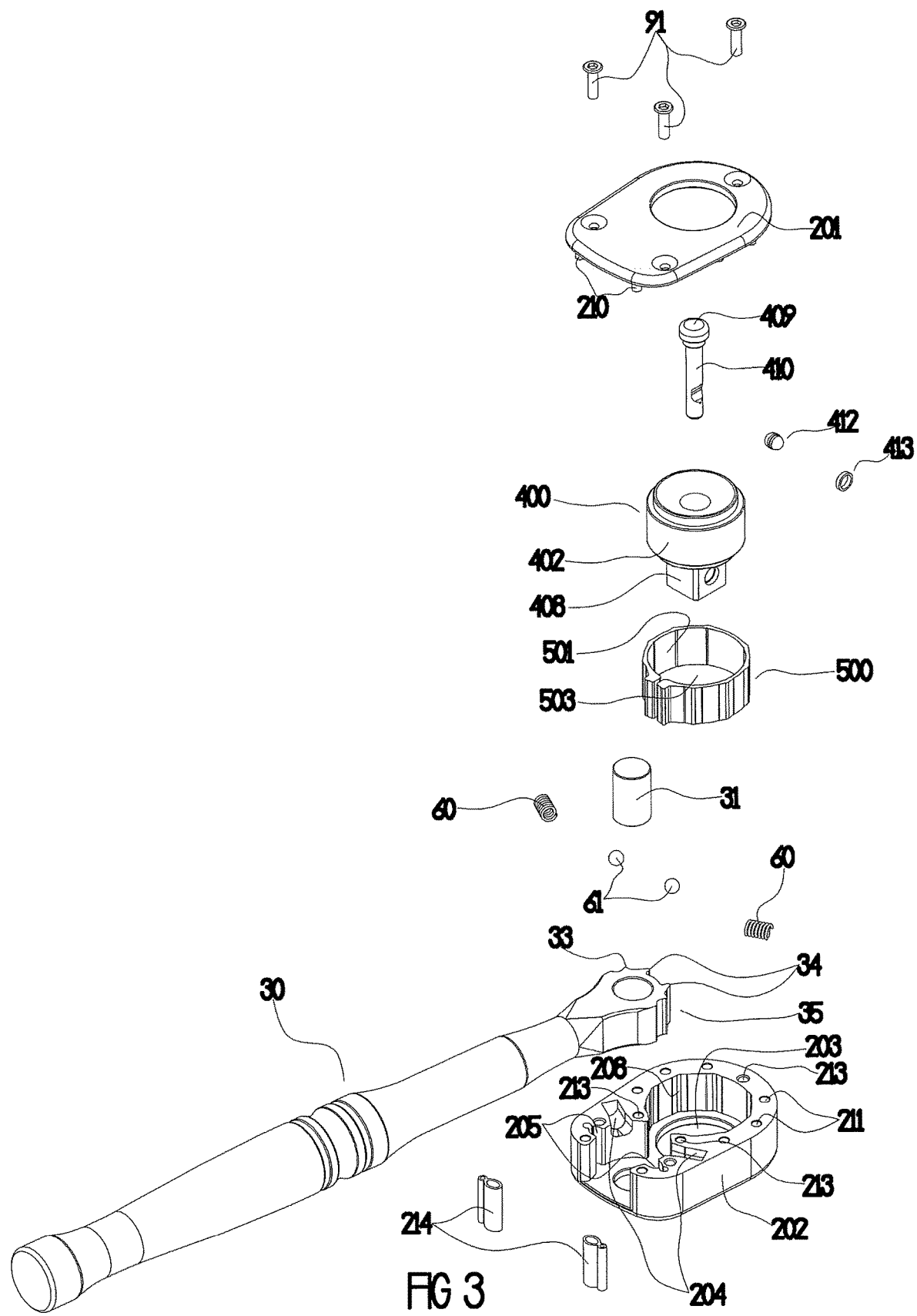
FIG. 3 is a perspective view of the locking clutch ratchet wrench, the parts are shown dismantled for display purposes.

FIG. 3 is a perspective view of the said locking clutch ratchet wrench 1, the parts are shown dismantled for display purposes. The top housing 201, bottom housing 202, housing aperture 203, spring and ball channel 204, dust seal channel 205, pivot pin recess 209, housing closure protrusion 210, housing closure holes 211, housing fixing holes 213, housing dust seals 214, and housing countersunk holes 221. The said handle 30, handle pivot pin 31, handle pivot bore 32, biasing protrusion 33, actuator 34 and levered end 35. The said drive element 400, drive teeth 401, said drive spigot 408. Clutch ring 500, clutch toothed portion 501, clutch smooth portion 504 and clutch aperture 503. The spring 60, ball 61, screw fixings 91 and alternate rivet fixing 92 with their centre holes 93 are further shown.

Figure 4:
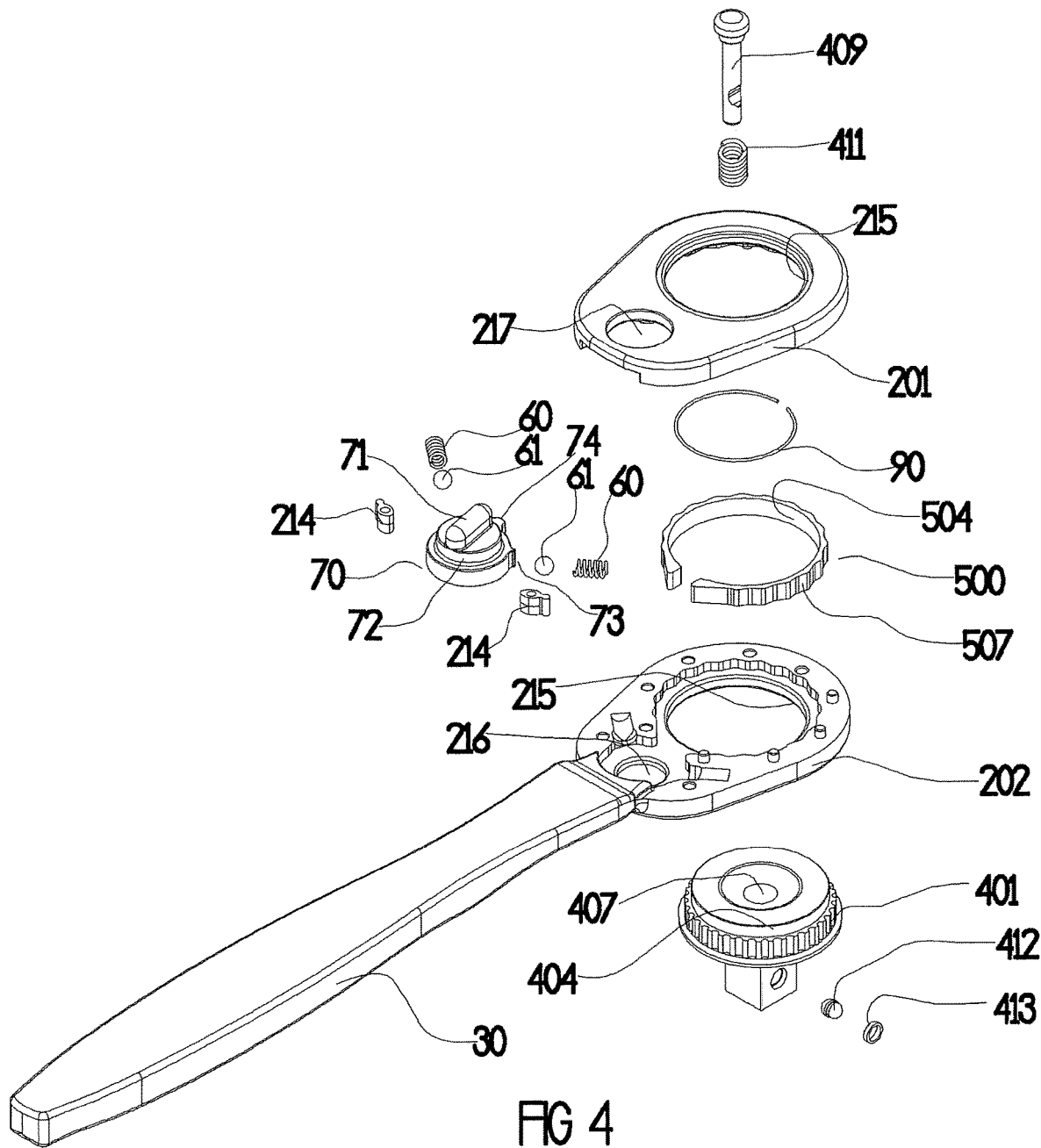
FIG. 4 is a perspective view of a switched version of the locking clutch ratchet wrench, the parts are shown dismantled for display purposes.

FIG. 4 illustrates a further embodiment of a said locking clutch ratchet wrench 1 wherein the drive direction D is effected by a said switch 70. The said bottom housing 202 is directly attached to the said handle portion 30, the said top housing 201 being secured by a retaining clip 90 within the drive retaining clip channel 404, the parts are shown dismantled for display purposes. The said drive 400 having a retaining flange 407, said notches 401, drive axle 403, said spigot 408 said push button 409 with its shaft 410 and bush button bore 406, spigot spring 411, spigot ball 412, spigot ball retainer 413 and spigot ball bore 414. The said clutch ring 500, said notched portion 501, said smooth portion 504 outer surface 507 and actuation faces 509. The said top and bottom housing 201, 202 having a drive flange recess 215. The said top housing 201, having a further switch axle recess 217 and the said bottom housing 202 having a corresponding housing switch axle recess 216. The said switch 70 having switch axles 72, biasing protrusions 73, actuator 74 and finger grip 71. In use the said switch 70 is operated in the required direction, the biasing protrusions 73 acting with the said springs and balls 60, 61 to resiliently urge the said switch actuator 74 against the corresponding clutch actuation face 509.

Figure 5:
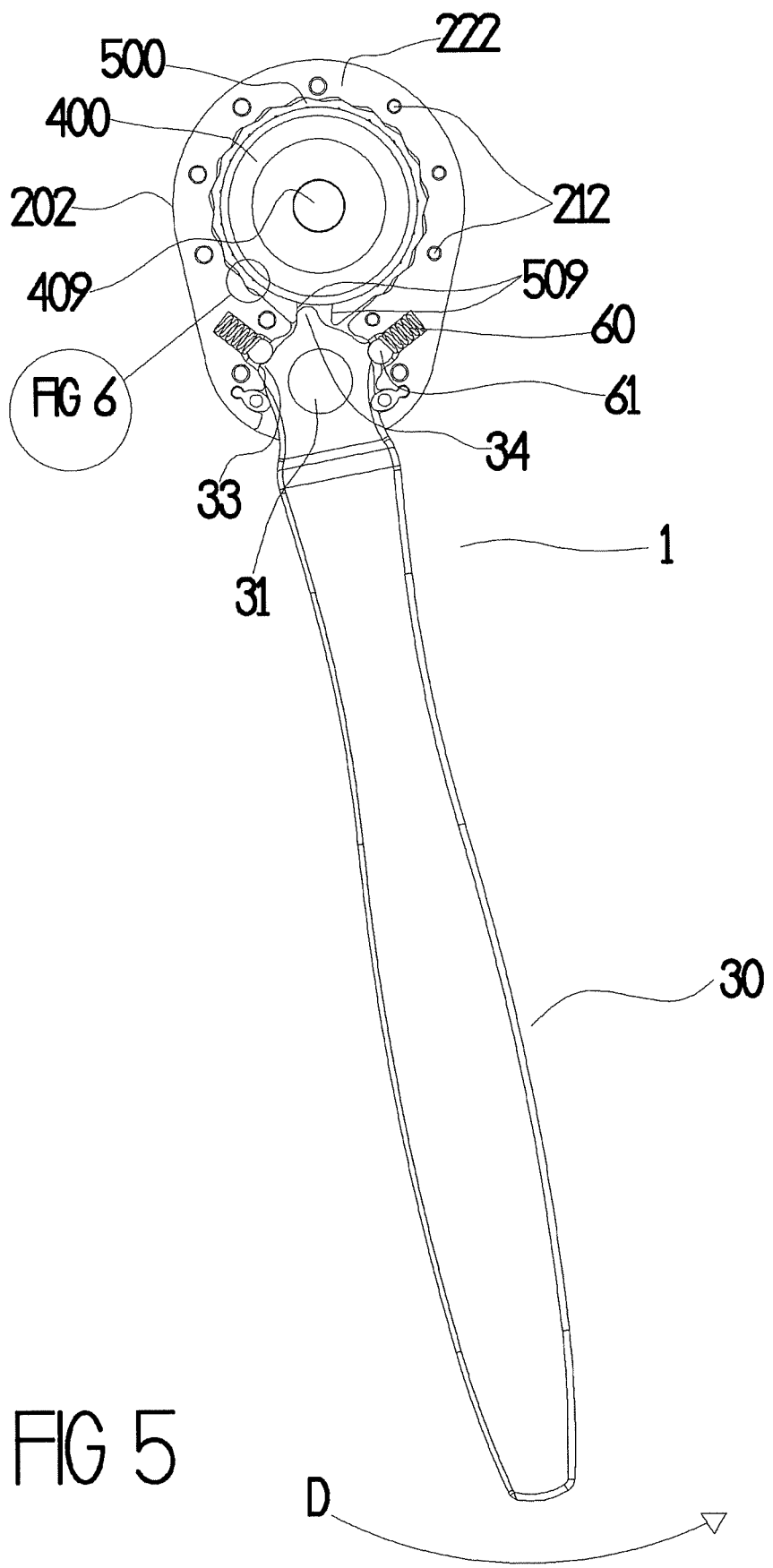
FIG. 5 is a top view of the compact locking clutch ratchet wrench, the top housing is removed (not shown) for display purposes.

FIG. 5 illustrates the said locking clutch ratchet wrench 1 operated in the drive direction D, the said top housing 201 (not shown) removed, showing the said bottom housing 202 inner face 222. The said handle 30 swivelled in the required said drive direction D around the said pivot pin 31, the resilient action of the said spring and balls 60, 61 upon the said biasing protrusions 33 urging the said actuator 34 against the said clutch actuation face 509. The said drive element 400 is shown within the said clutch ring 500. The closure of the said top and bottom 201, 202 housings is effected by the illustrated rivet upstands 212.

Figure 6:
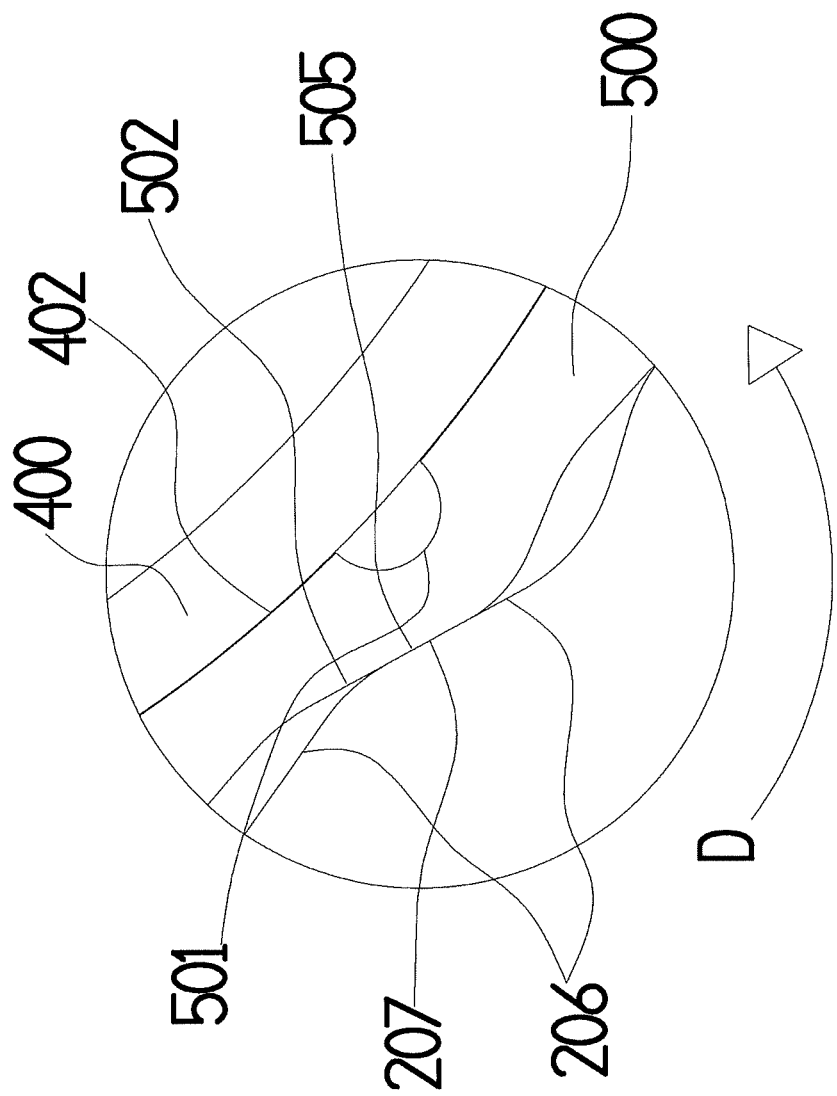
FIG. 6 is a close up view of the locking clutch ratchet wrench, drive, clutch notches, clutch and housing ramps.

FIG. 6 is a close up view of the said locking clutch ratchet wrench 1, clutch notched portion 501 engaged upon the said drive smooth portion 402. The said clutch rings 500 engagement with the said drive element 400 robustly enhanced by the inward projection of the said clutch ring 500 as the clutch transmission ramps 502 and abutment angles 505 abutting the housing ramps 206 and contact angles 207 are driven upwards against one another as the said ratchet 1 is operated in the drive direction D.

Figure 7:
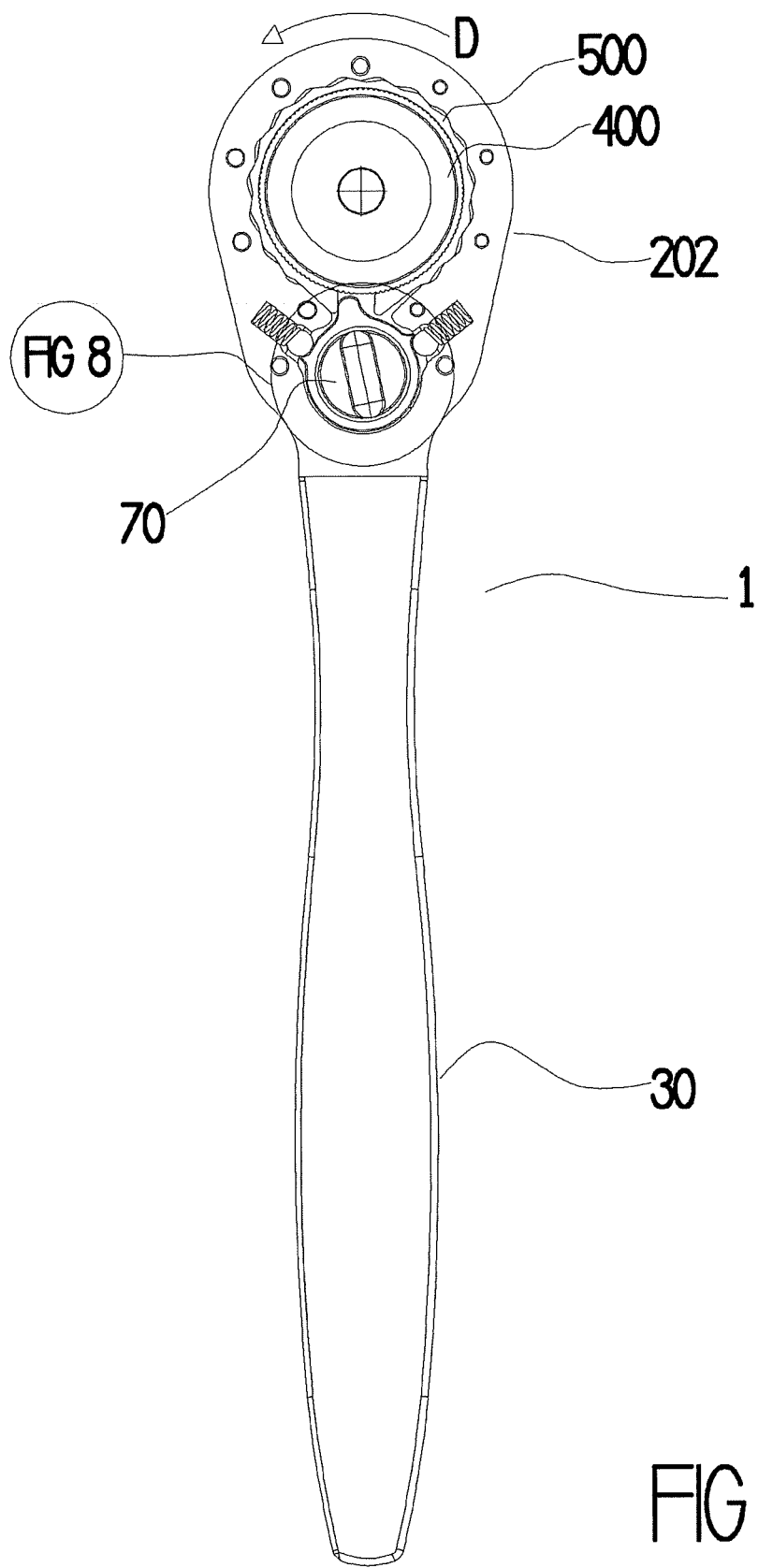
FIG. 7 is a top view of a switched version of the locking clutch ratchet wrench, the top housing is removed (not shown) for display purposes.

FIG. 7 is a top view of a said switch 70 version of the said locking clutch ratchet wrench 1, the top housing 201 (not shown) removed illustrating the said drive 400 and clutch ring 500. The said bottom housing 202 is directly attached to the said handle portion 30.

Figure 8:
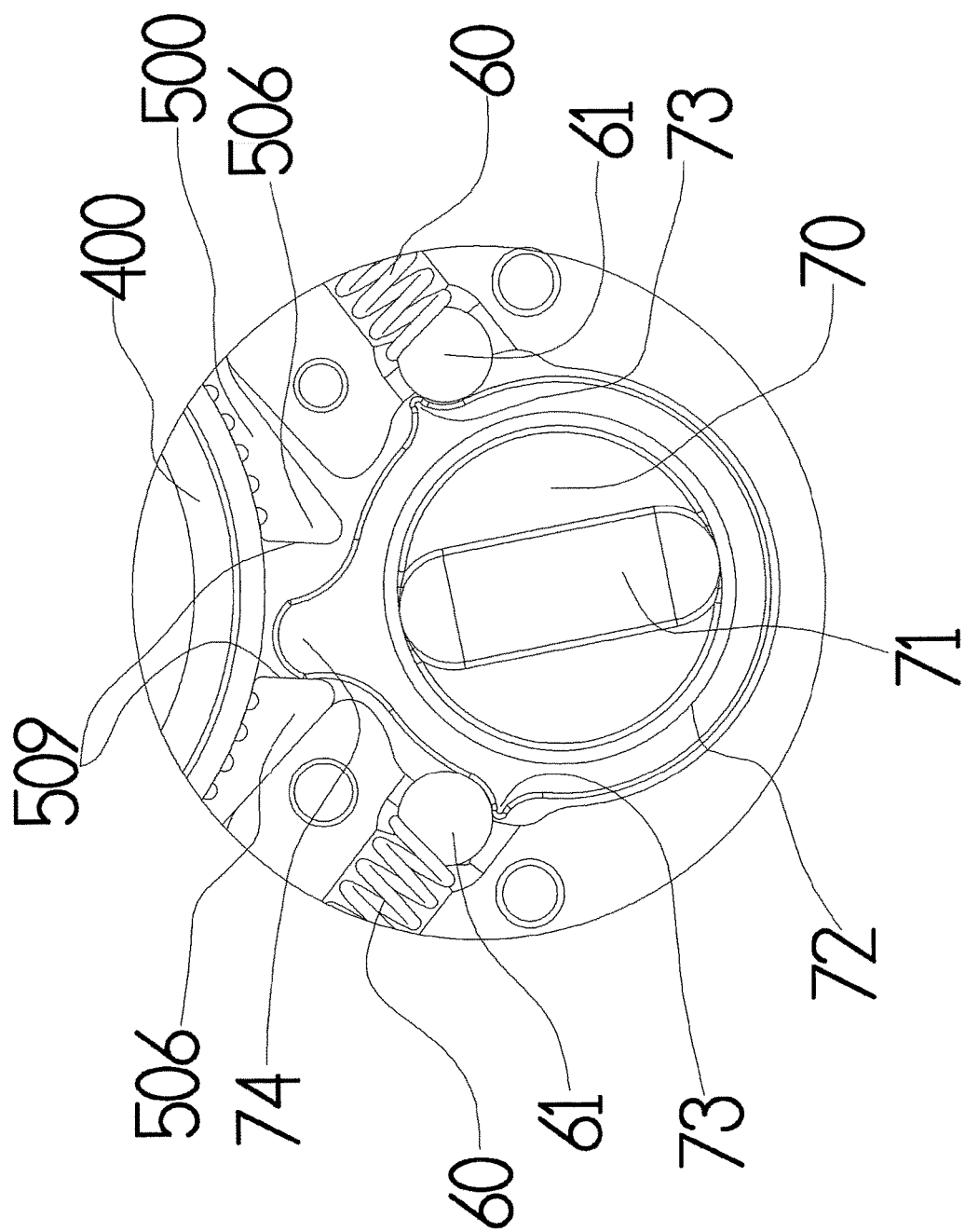
FIG. 8 is a close up view of a switched version of the locking clutch ratchet wrench denoting the switch with the biasing protrusions and its interaction with the clutch actuation faces.

FIG. 8 is a close up view of the said switch 70 version of the said locking clutch ratchet wrench 1 denoting the said switch 70 with its said biasing protrusions 73, said switch axle 72, said finger grip 71 and its actuators 74 interaction with the clutch actuation faces 509. The said spring and balls 60, 61 providing the said biasing of the said clutch ring 500 in the required Drive direction D. The said biasing spring 60 resilient force being transmitted via the said switch biasing protrusion 73 then said actuator 74 to the said clutch actuation face 509 within the tail portion 506.

Figure 9:
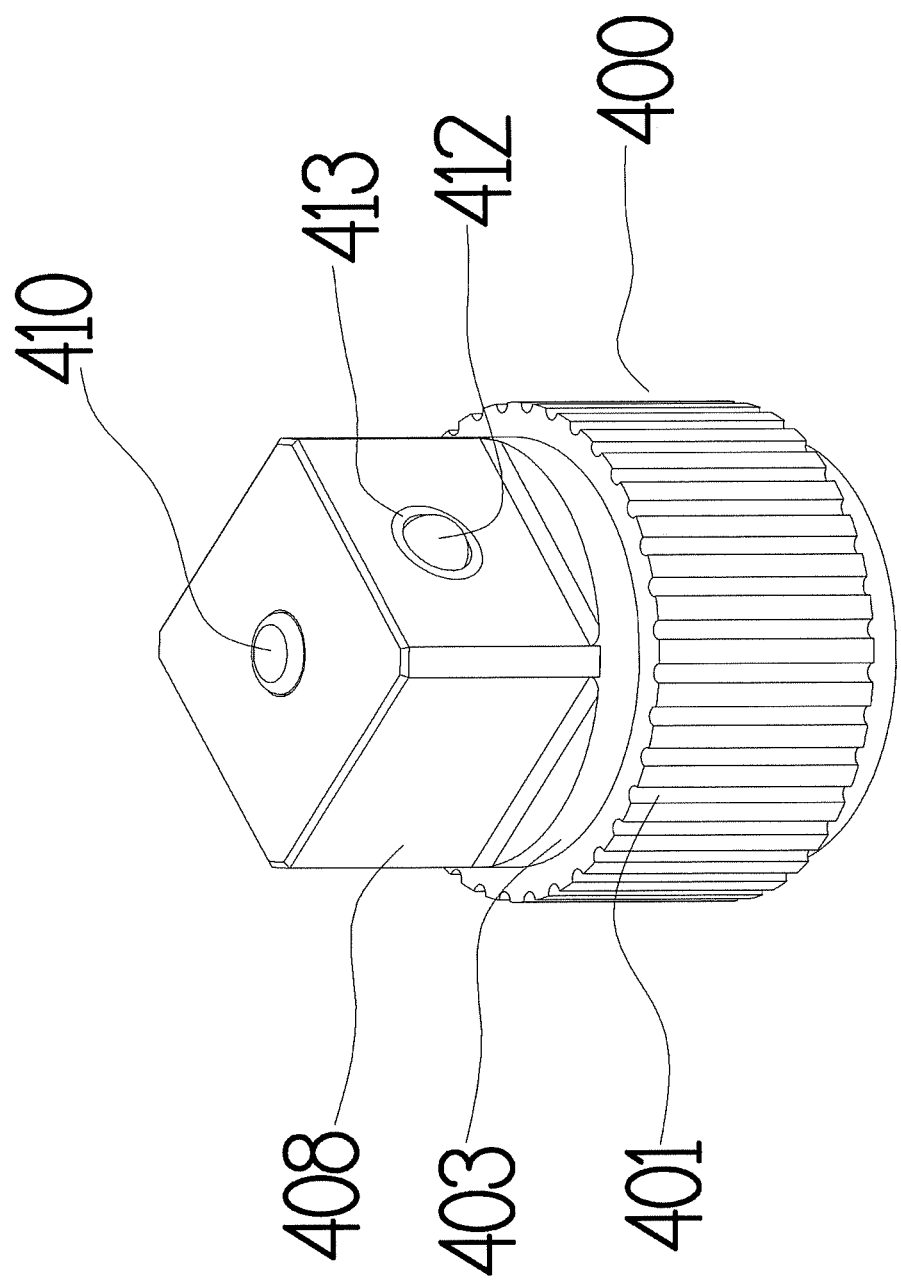
FIG. 9 is a perspective view of the locking clutch ratchet wrench the outer drive surface with flat topped teeth.

FIG. 9 is the said drive element 400 showing the said drive notches 401, drive axles 403, said spigot 408, said push button shaft 410, spigot ball 412 and spigot ball retainer 413.

Figure 10:
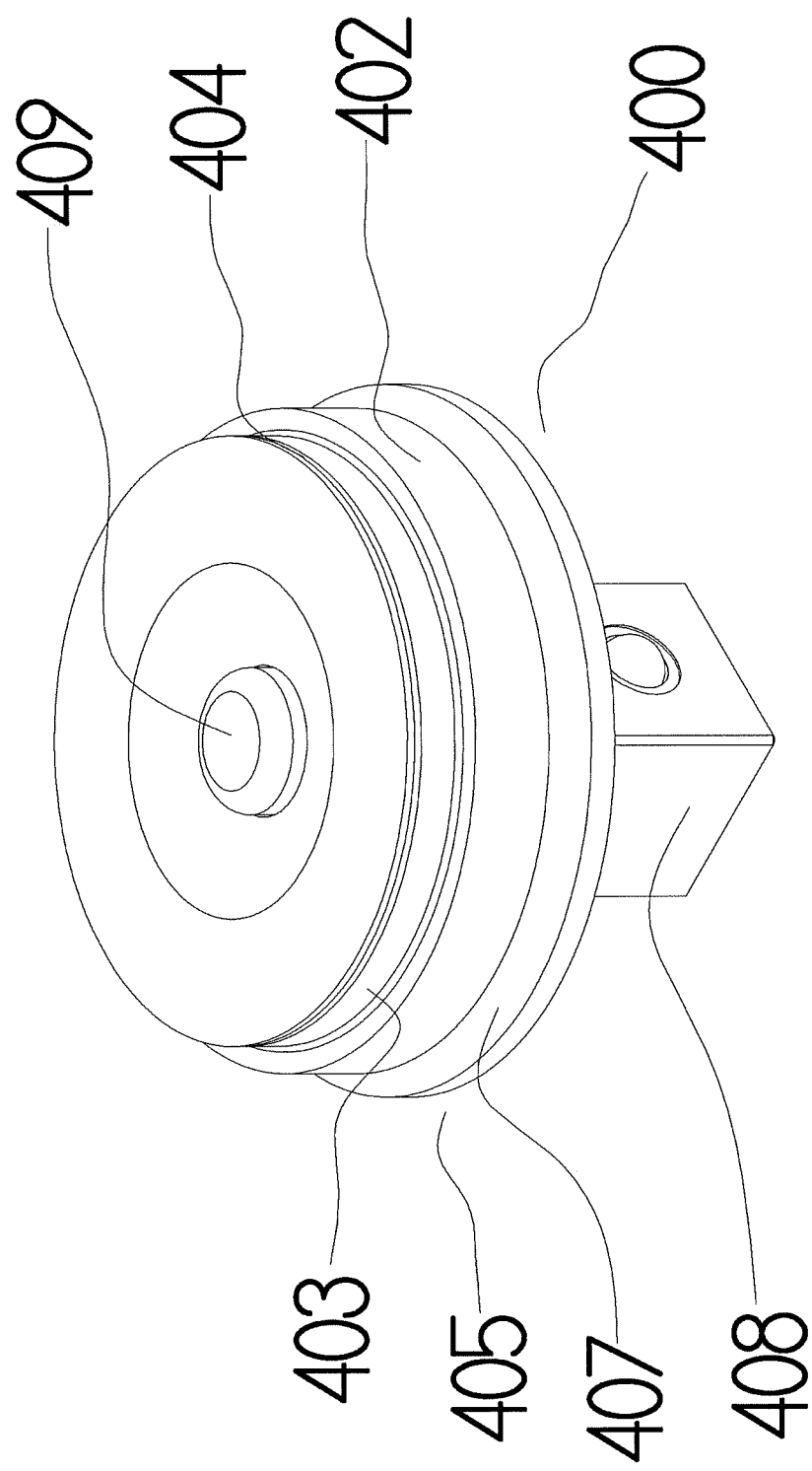
FIG. 10 is a perspective view of the locking clutch ratchet wrench drive element with a smooth outer surface complete with retaining flange.

FIG. 10 is a further iteration of the said drive element 400 complete with a retaining flange 407, comprising said drive smooth portion 402, said drive axle 403, said retaining clip channel 404, outer surface 405, said spigot 408 and push button 409.

Figure 11:
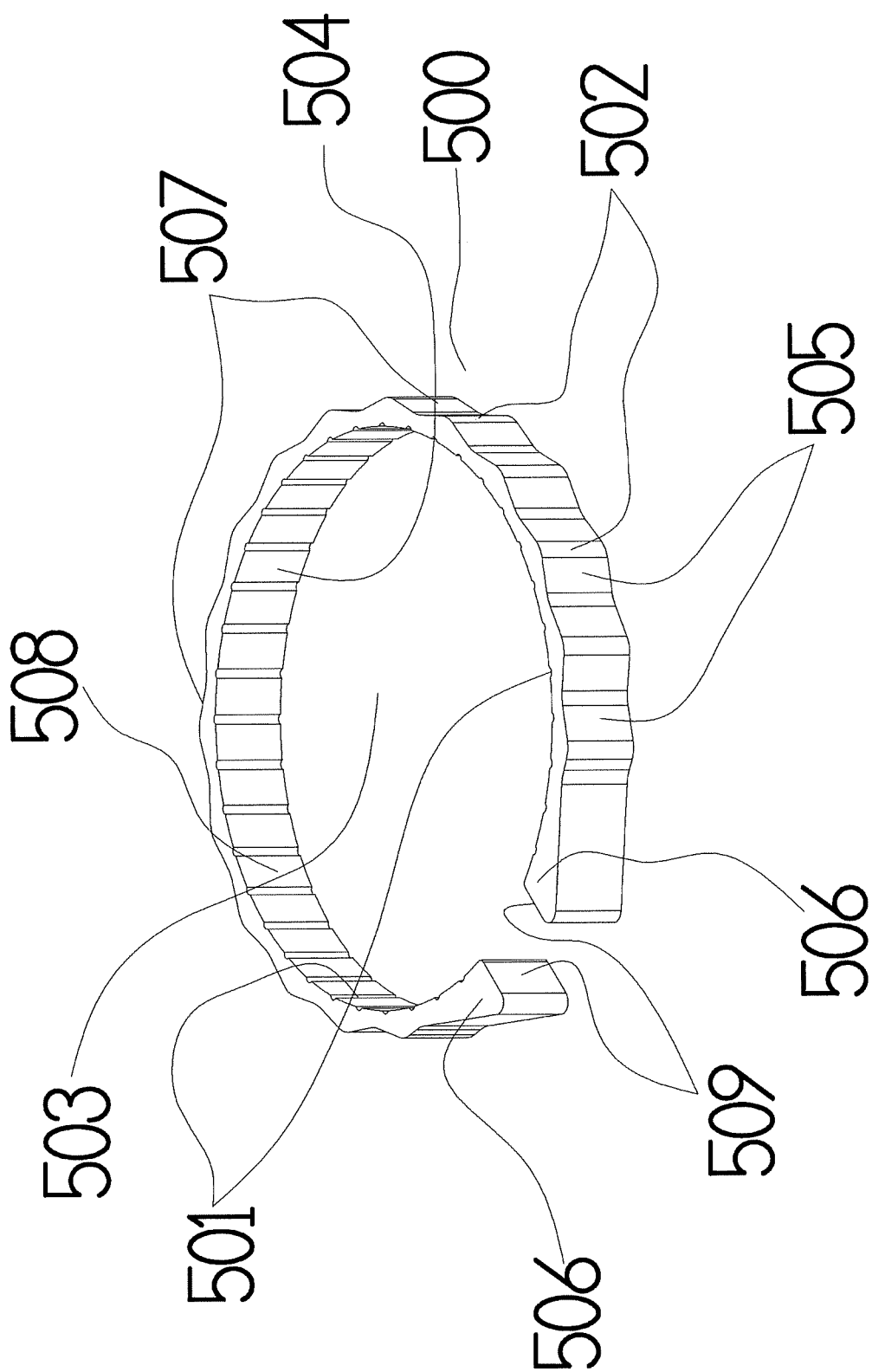
FIG. 11 is a perspective view of the locking clutch ratchet wrench clutch ring with notches within its inner surface.

FIG. 11 is the said clutch ring 500 comprising, a said notched portion 501, said transmission ramps 502, said aperture 503, said smooth portion 504, said abutment angle 505, said tail portion 506, said outer surface 507, inner surface 508 and said actuation faces 509.

Figure 12:
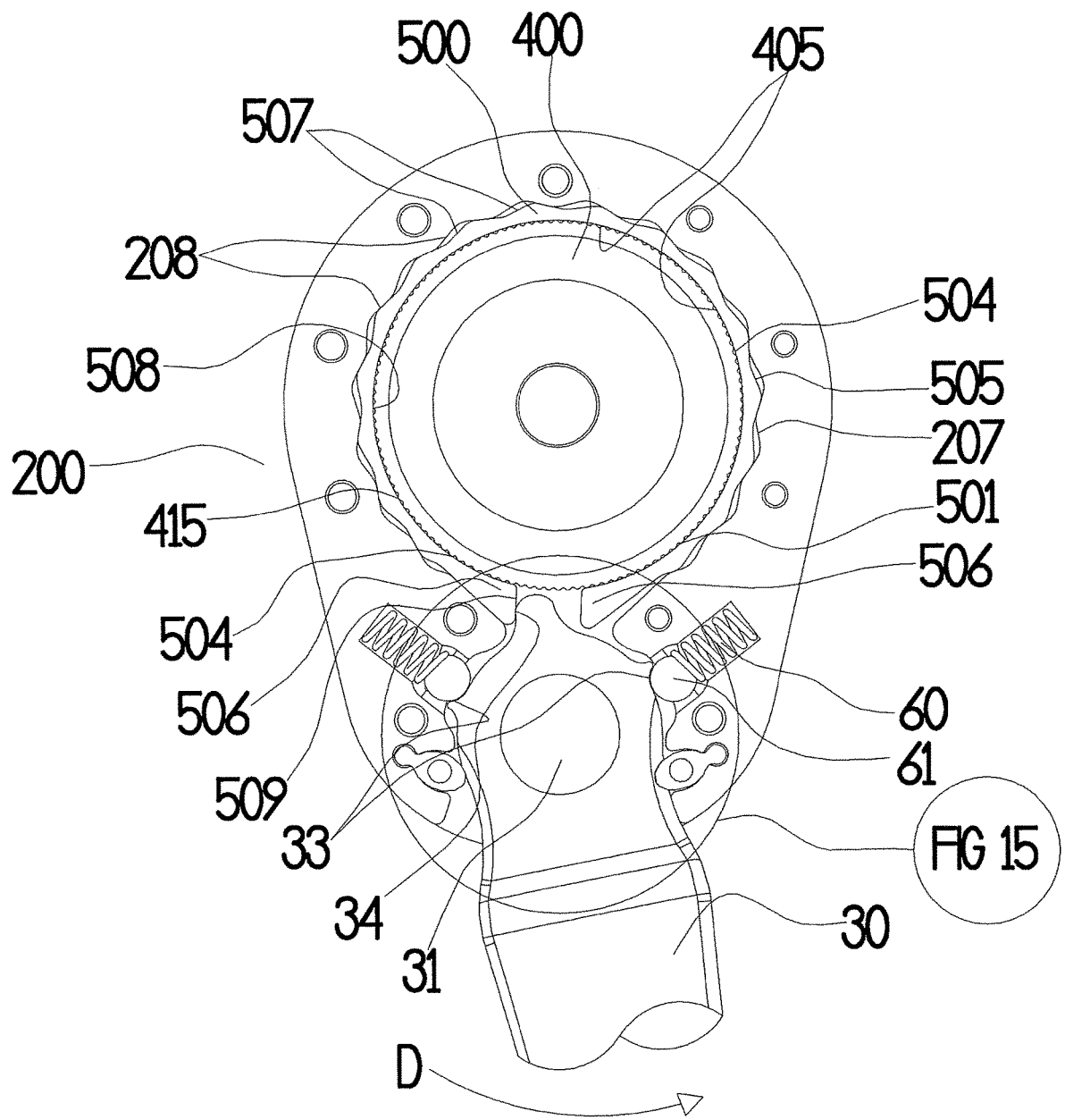
FIG. 12 is a top view of the locking clutch ratchet wrench head portion, the top housing is removed (not shown) for display purposes.

FIG. 12 is a top view of the said locking clutch ratchet wrench 1, said head portion 200, the said top housing 201 removed (not shown). The said handle 30 and said head portion 200 rotating as required around the said handle pivot pin 31, operated in the said Drive direction D, the said springs and balls 60, 61 resiliently acting on the said handle protrusions 33 causing the said actuator 34 to resiliently act against the said clutch actuation face 509 thereby urging the said clutch smooth portion 504, said clutch tail portion 506 to engage the said corresponding drive element 400 flat topped teeth 415. This initial grip further allows the said clutch ramp abutment angle 505 to act upon the said housing ramps contact angle 207 forcefully constricting the said clutch ring 500 said smooth portion 504 upon the said drive element outer surface 405. The compression and locking force increasing according to the torque applied to the said handle portion 30. It can be observed from the illustration that during use in the said drive direction D that the housing inner surface 208 is in equal force contact with most of the said clutch outer surface 507 and the said clutch inner surface 508 is in equal force contact upon the majority of the drive outer surface 405 thereby substantially distributing the inward and outward forces evident within the said head portion 200 within the circumference of the aforementioned parts. The outcome of this construction is a pseudo laminate construction which is far stronger than the prior art separate component constructions. The said present invention 1 is able to be in one example to be slimmer in profile yet still exceed all relevant torque specifications better than any previous commercially available device.

Figure 13:
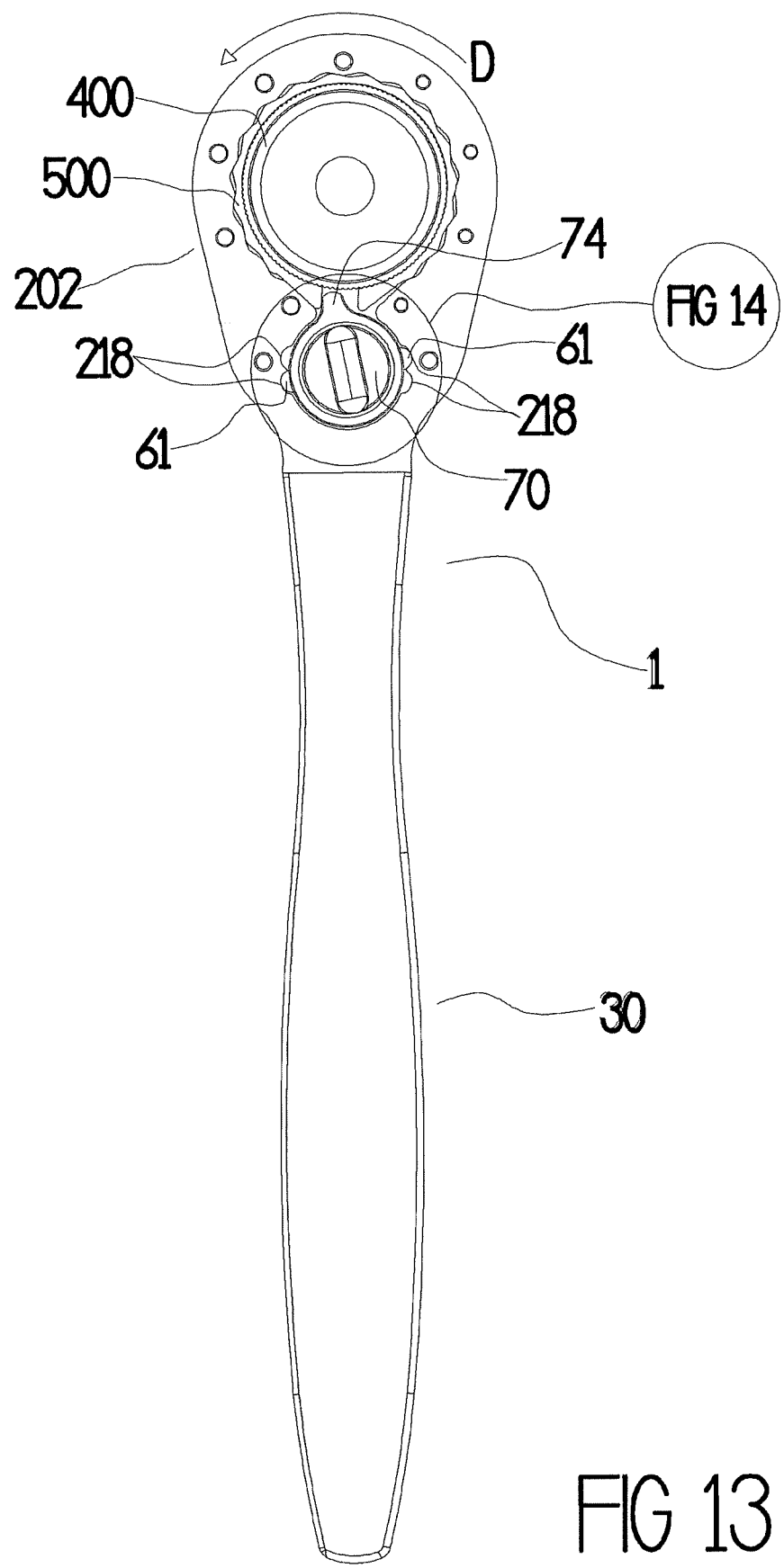
FIG. 13 is a top view of an alternate switched version of the locking clutch ratchet wrench, the top housing is removed (not shown) for display purposes.
Figure 14:
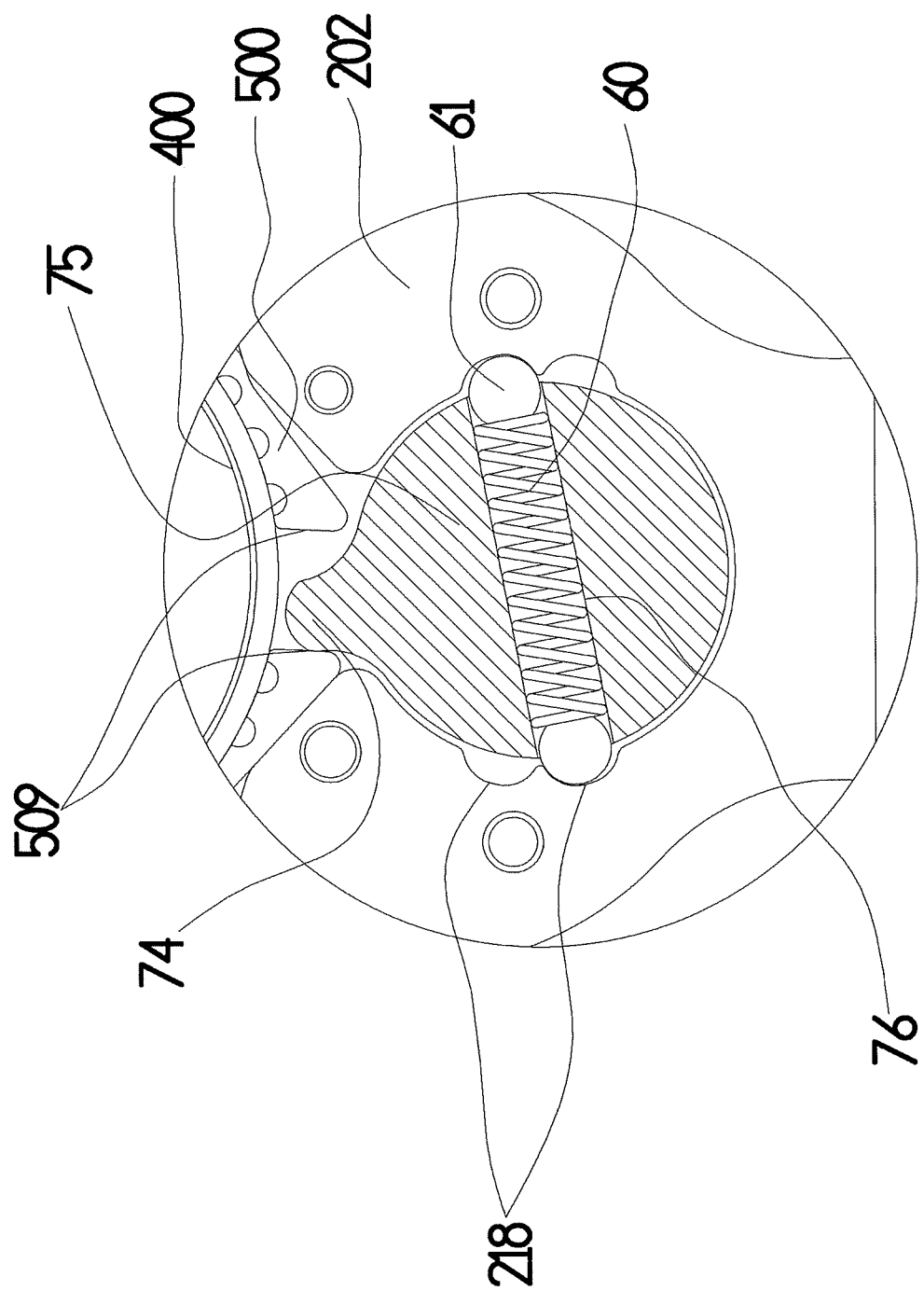
FIG. 14 is a close up view of an alternate switched version of the locking clutch ratchet wrench denoting the housing with biasing protrusions, the switch is shown in section to illustrate the spring and balls within the spring bore and their interaction with the clutch actuation faces.

FIGS. 13, 14 (the switch 75 shown in section) shows an alternate said switched 75 version of the said locking clutch ratchet wrench 1, the said top housing 201 removed (not shown), the said bottom housing 202 affixed the said handle portion 30. The said alternate switch 75 having a spring bore 76 retaining the said spring 60 and balls 61. The said balls 61 acting against the alternate biasing profile 218 in order to impose the required resilient pressure in the desired drive direction D from the said switch actuator 74 to the said clutch actuation face 509 in order to resiliently initially engage the said clutch ring 500 upon the said drive element 400.

Figure 15:
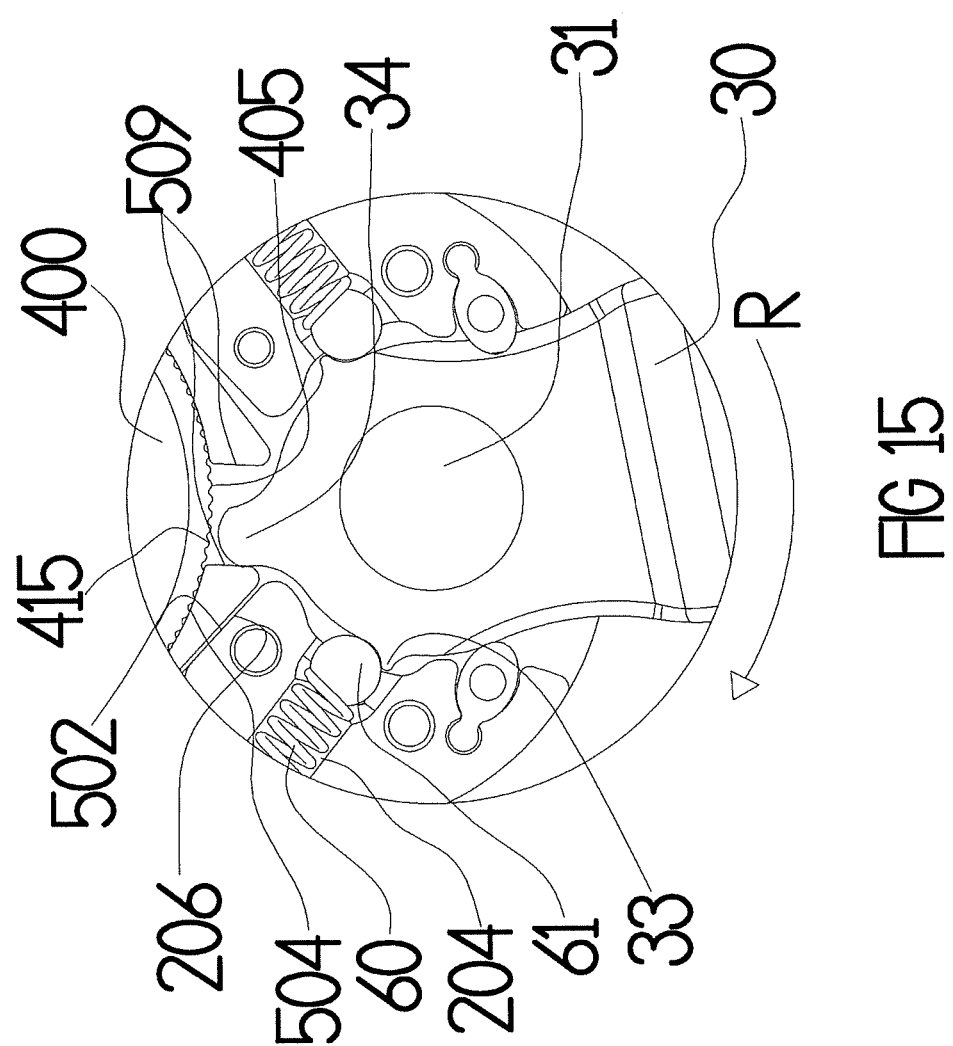
FIG. 15 is a close up view of the locking clutch ratchet wrench clutch inner notched smooth portion gripping upon the flat topped drive toothed outer surface. The clutch ramp abutment angles and housing ramps contact angles are shown disengaged as they would be in the reverse or reposition direction.

FIG. 15 is a close up view of the said locking clutch ratchet wrench 1, said clutch ring 500 said inner smooth portion 504 gripping upon the said flat topped drive teeth 415. The said ratchet 1 operated in the reverse or reposition direction R. The said handle portion 30 pivoting around the said pivot pin 31, the said biasing protrusions 33 acting against the resilience of the said spring 60 and balls 61 within the said spring and ball channel 204, relieving the said actuators 34 contact with the said clutch actuation faces 509 further alleviating the ramped contact between the said housing ramps 206 and the said clutch transmission ramps 502, further relieving the grip of the said clutch smooth portion 504 upon the said drive outer surface 405 of the said drive portion 400.

Figure 16:
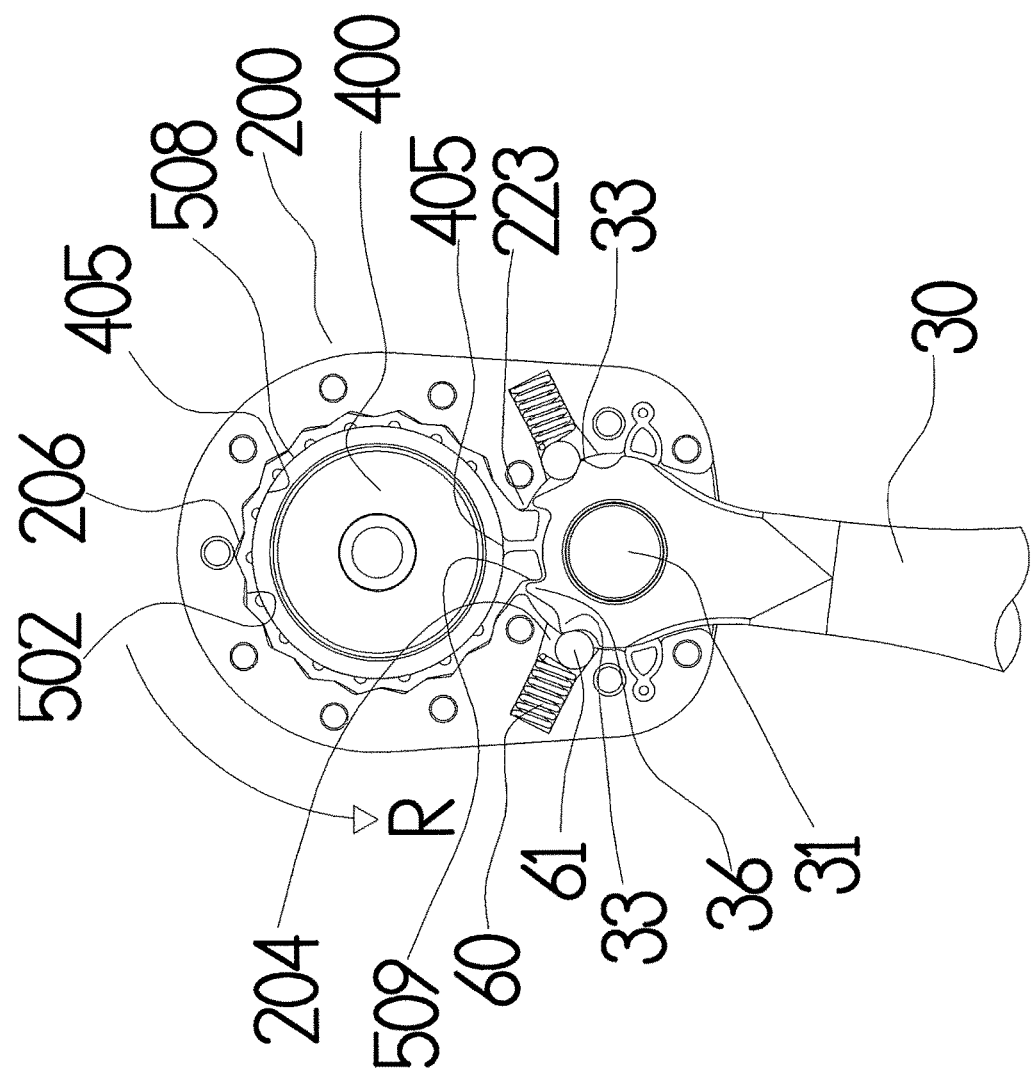
FIG. 16 is a top view of an alternately actuated version of the locking clutch ratchet wrench biased in the drive direction, the top housing is removed (not shown) for display purposes.
Figure 17:
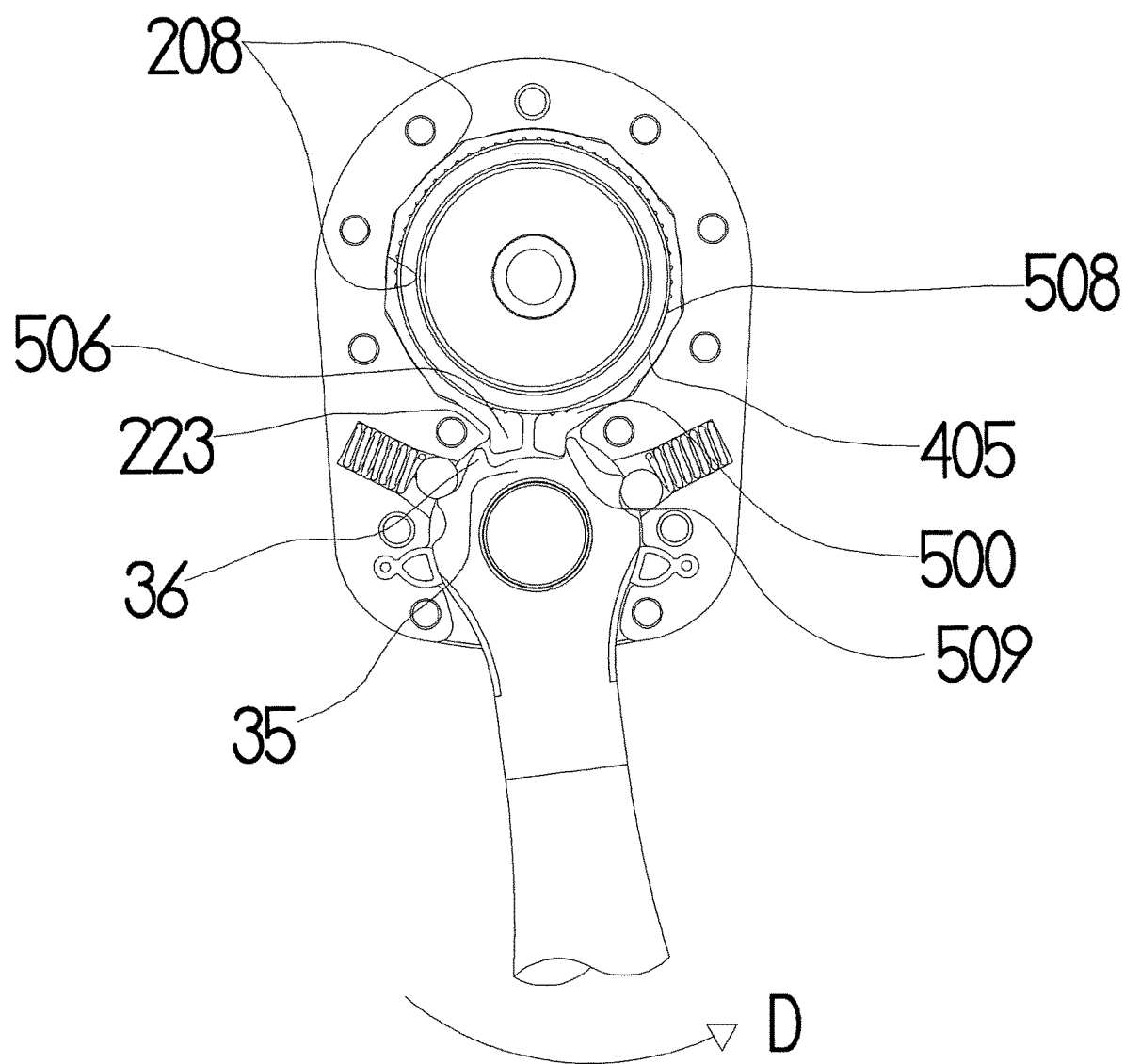
FIG. 17 is a top view of an alternately actuated version of the locking clutch ratchet wrench the handle biased in the opposite direction, the top housing is removed (not shown) for display purposes.

FIG. 16 reverse direction R), FIG. 17 (drive direction D), shows a top view of a further version of the locking clutch ratchet wrench said head portion 200, the said top housing 201 removed (not shown). The said handle 30 and said head portion 200 rotating as required around the said handle pivot pin 31, operated in the reverse or reposition direction R, the said handle protrusions 33 causing the said springs and balls 60, 61 to be resiliently propelled back up the said spring and ball channel 204 thereby causing the said actuator 36 to reduce or release its pressure against the said clutch actuation face 509, the said clutch transmission ramps 502 no longer abutting the corresponding said housing ramps 206 thereby disengaging the said clutch inner surface 508 from the drive outer surface 405 and allowing the said head portion 200 to rotate relative to the said drive element 400.

FIG. 17 (drive direction D) shows a further version of the said small head ratchet 1, the said top housing 201 removed (not shown), wherein the said clutch ring 500 has its said actuation faces 509 said actuator 36 contact on the said opposite tail portions 506, meaning that the said clutch ring 500 is pulled around the said housing inner surface 208 in the first instance, not pushed as previously shown. The said handle levered end 35 said actuators 34 being further recessed, the said clutch tail portion 506 not operated by the said actuator 34 retained by the housing abutment 223 if required as the said clutch inner surface 508 clamps the said drive outer surface 405.

Figure 18:
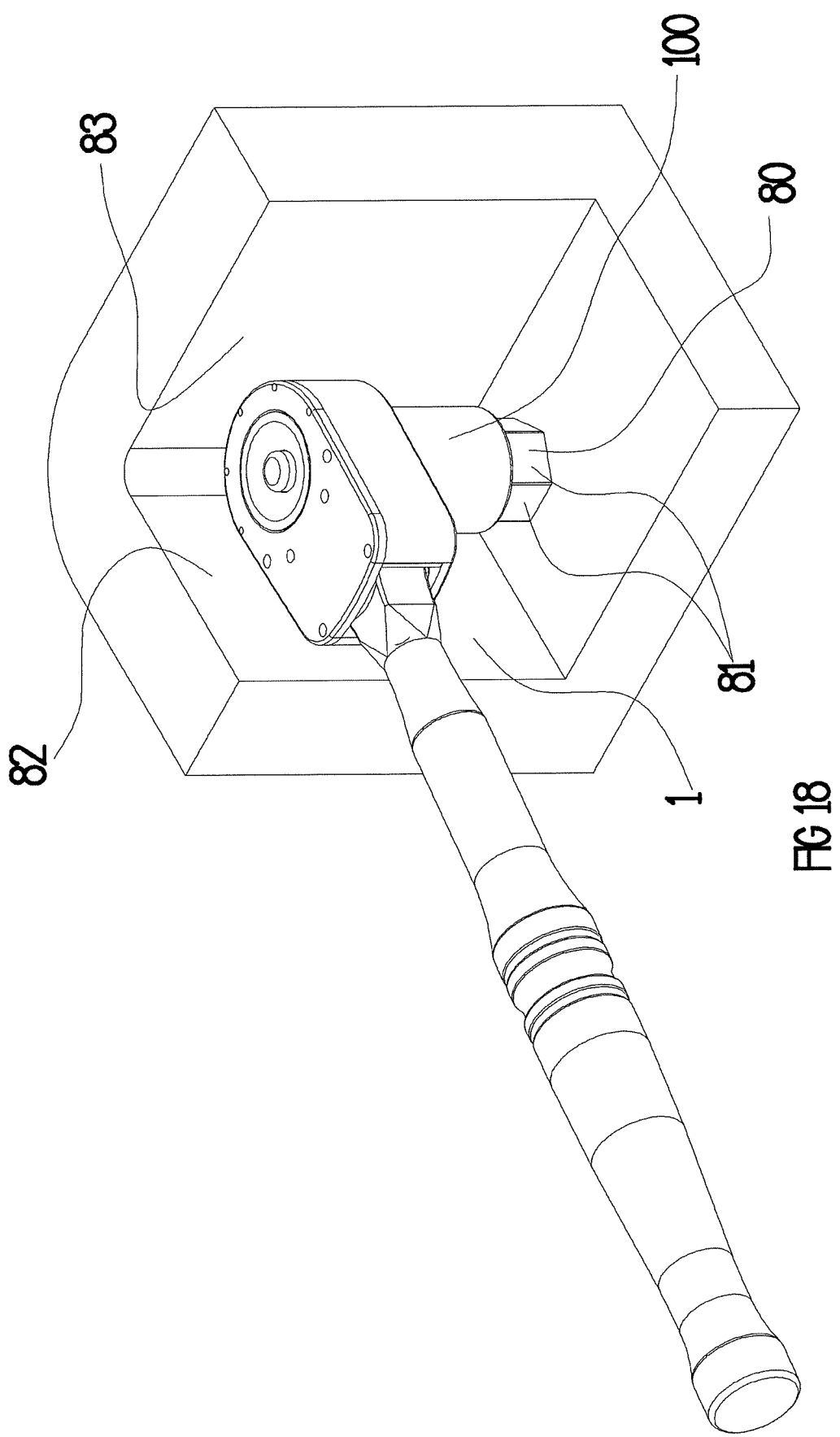
FIG. 18 is a perspective view of the locking clutch ratchet wrench. A socket is shown engaged upon the ratchet mechanism spigot, the ratchet being used in close vicinity of obstructions.

FIG. 18 illustrates the said locking clutch ratchet wrench 1 with a said socket 100 engaged upon the drive spigot 408 (not visible). The said socket 100 further engaged upon an appropriately sized fastener 80 drive surfaces 81. The said locking clutch ratchet wrench 1 and said socket 100 shown for illustration purposes operated in a gap between close obstruction (a) 82 and obstruction (b) 83.

Figure 19:
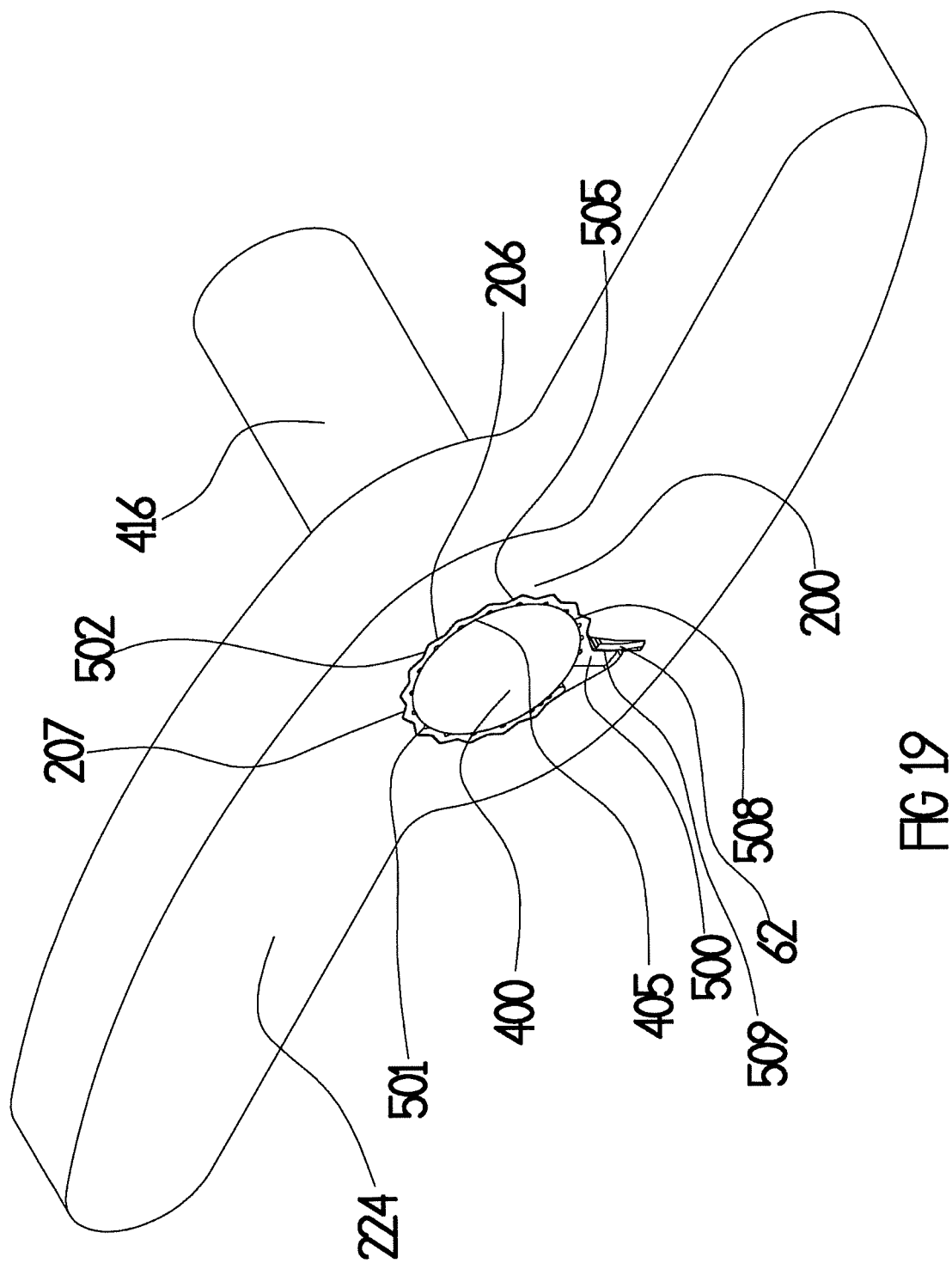
FIG. 19 is a perspective view of the said locking clutch ratchet wrench incorporated into a housing block.

FIG. 19 is a perspective view of the said locking clutch ratchet wrench mechanism 1 whereas the said drive element 400 drives the said head portion 200 (or housing 201, 202), the present example for demonstration purposes only is incorporated into a blade housing 224. The said clutch actuator face 509 kept in one way tension by a resilient portion such as the leaf spring 62 shown. The said ratchet mechanism 1 can be utilized as a one way drive, the said shaft 416 being locked by the said clutch inner surfaces 508 grip upon the drive outer surface 405 as the said clutch ramps 505 are propelled up the said housing ramps 207. The said shaft 416 being also capable of reverse R rotation against the resilient pressure of the said leaf spring 62.

In the example shown the said housing ramps 206 and said clutch transmission ramps 502 need only be shaped in one direction as the said drive shaft 416 only revolves in one direction.

Figure 20:
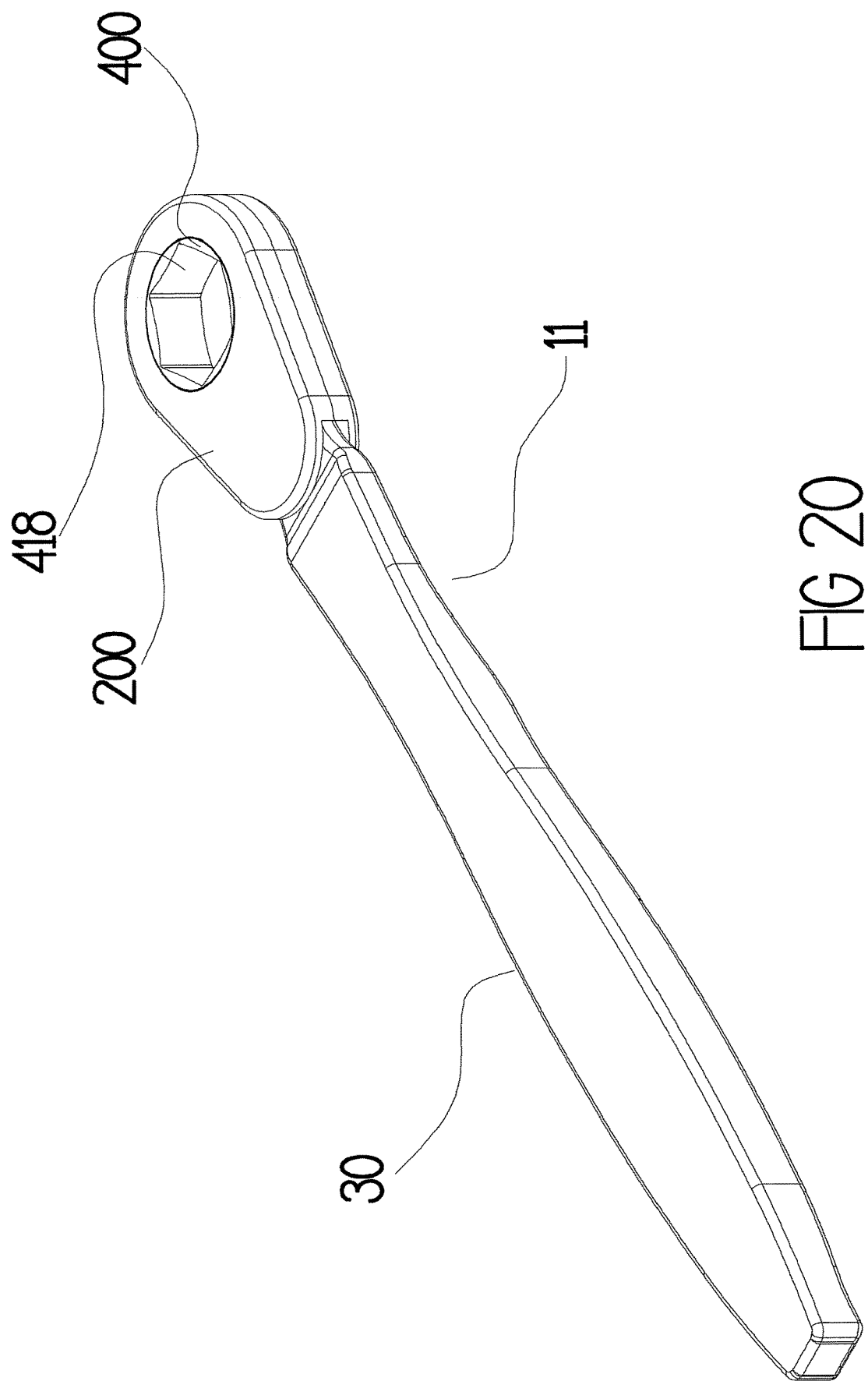
FIG. 20 is a perspective view of the said locking clutch ratchet wrench incorporating a fastener engaging profile within the drive.

FIG. 20 is a perspective view of the said locking clutch ratchet wrench illustrated as a ratcheting wrench 11 incorporating a fastener engaging profile 418 within the said drive element 400. The housing 200 and handle 30 are further denoted.

Figure 21:
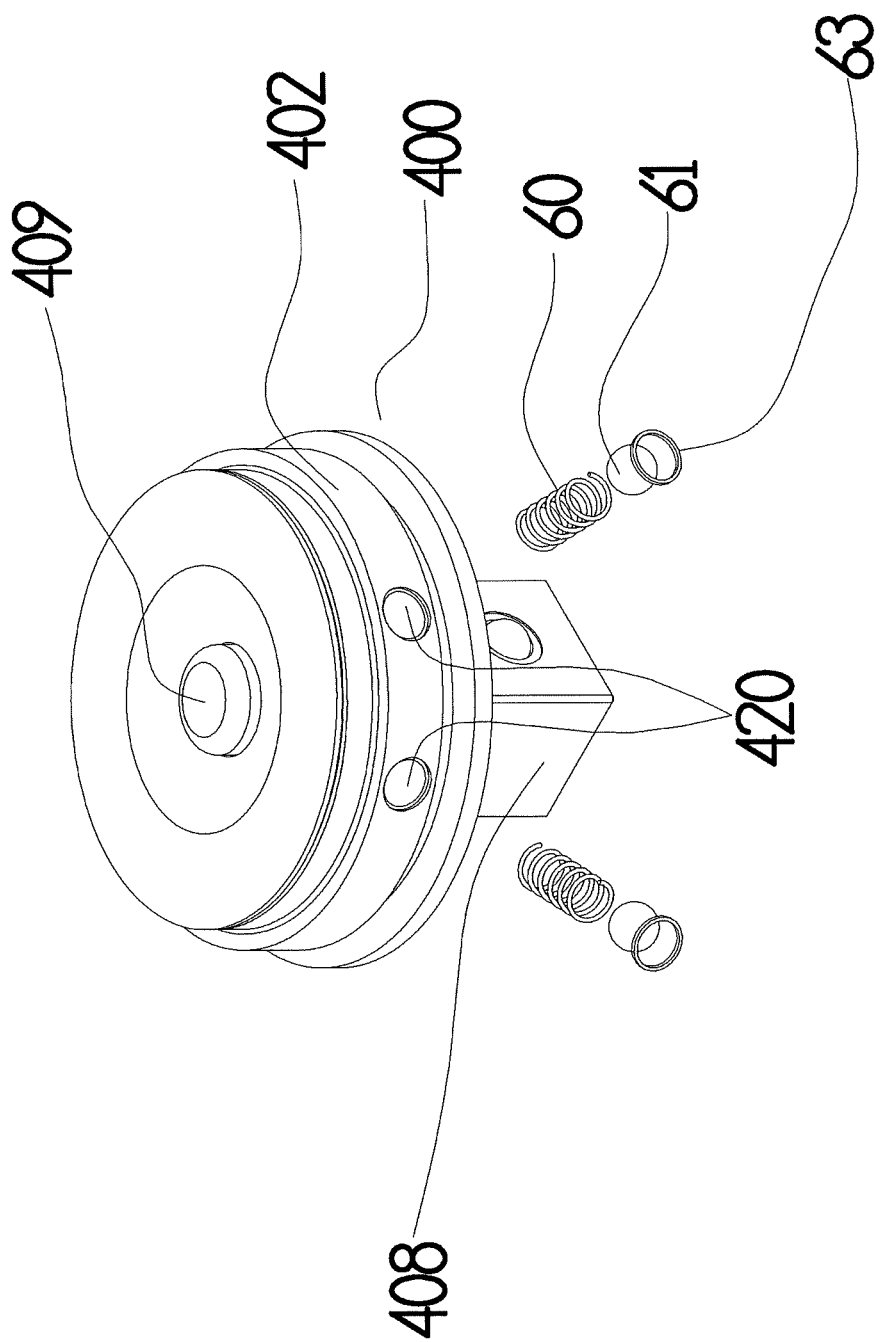
FIG. 21 is a perspective view of the said locking clutch ratchet wrench illustrating the said drive element with at least one spring and ball bore for the retention of said spring, ball and retainer, the parts shown dismantled for display purposes.

FIG. 21 is a perspective view of the said locking clutch ratchet wrench 1 said drive element 400 ball and spring bore 420 incorporating a said ball 61, said spring 60 and ball retainer 63 within the said drive smooth portion 402, the parts dismantled for demonstration purposes.

Figure 22:
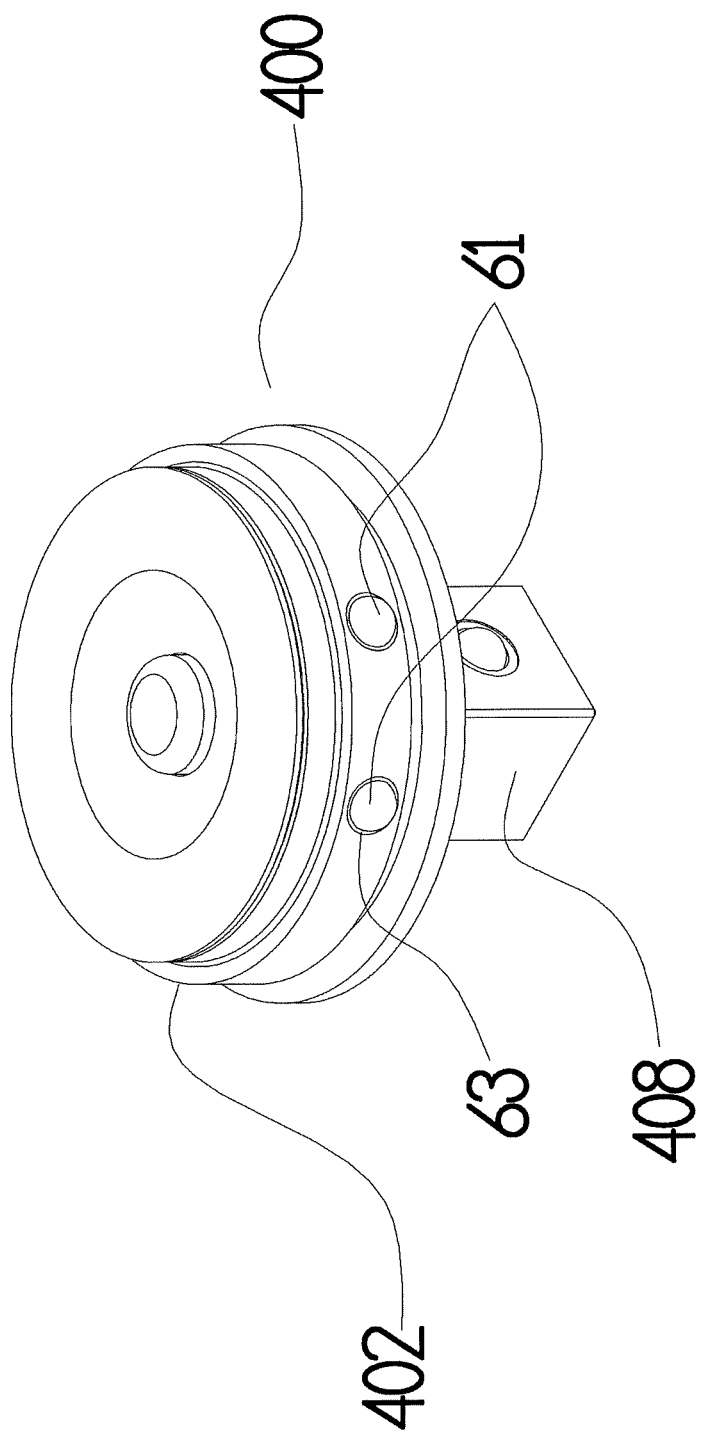
FIG. 22 is a side view of the said locking clutch ratchet wrench drive element illustrating the ball protruding from the drive outer surface.

FIG. 22 is a side view of the said locking clutch ratchet wrench 1 said drive element 400 incorporating a said ball 61, said spring 60 (not shown) and said ball retainer 63 the said ball protruding from the profile of the drive outer surface 405

FIGS. 1 to 22 illustrate various examples of the said low profile ratchet 1 wherein The said levered end 35 of the said handle portion 30 has, in one iteration, said biasing protrusions 33 for interaction with at least one said spring 60 and ball detents 61, the said sprung detent 60, 61 acting to provide a direction bias and the initial grip in the required said drive direction D of the said clutch ring 500 upon the said central drive 400. In the said devices 1 rest position the partially compressed said springs 60 transmit their resilient force via the said detent balls 61 and said handle levered end 35 said actuator 34 to the said clutch ring 500 in order to provide the necessary initial clamping of the said clutch ring 500 and to obviate any slack or play inherent in normal ratchets.

Embodiments of the invention may comprise a said ratchet mechanism wherein in order to optimise the clutch ring's 500 inner surface 508 grip upon the corresponding said drive portion 400 outer circumference 405, said notches, slots or recesses 501 are incorporated into either the said clutch inner surface 508 or the said drive portion outer surface 405 the said corresponding surface being substantially smooth 504, 402. These said recesses 501, 401 have at least one said leading edge 510, 417, which advantageously enhances the opposing surfaces grip upon each other resulting in a far greater torque transmission capability of the ratchet wrench 1 or correspondingly or at least enabling the reduction of the size of the said head portion 200. The clutch ring 500 having in one example a said generally smooth inner surface 504 and a said outer surface 507 with said ramp like protrusions 502 corresponding to said like ramps 206 within the said inner surface of the housing 208. When the said handle 30 or drive shaft 416 is further operated in the said drive or locking direction D the said smooth 504 inner surface 508 of the said clutch ring 500 having initially resiliently clamped the corresponding said notched 401 profile or said flat topped teeth 415 of the said circumferential surface 405 of the said driven member 400 in order that when additional torque is applied in the said drive direction D to the said handle portion 30 or drive shaft 416 the said clutch portion 500 is further urged inwards as the said clutch transmission ramps 502 usefully engage the corresponding said inner housing ramps 206, further propelling the said inner surface 508 of the said clutch ring 500 inwards upon the said outer surface 405 of the said central drive portion 400, its said spigot 408 and attached said socket 100 enabling the said correspondingly sized engaged fastener 80 to be robustly driven. In order to optimise the clutch ring 500 initial said inner surface 508 grip upon the corresponding said drive portion 400 said outer circumference 405 the said notched portion 501 of the said clutch 500 has small radiused leading edges 510 which usefully accentuate the said clutch rings 500 grip upon the corresponding said drive smooth portion 402.

Operating the said handle 30 in said reverse or reposition direction R the said actuator 34 releases its initial or direction biasing force clamping the said clutch inner surface 508 upon the said drive element circumference 405 provided by the said detent resilient portion 60, 61 acting to free the said clutch ring 500 from the said drive portion outer circumference 405. The action of the said drive portion 400 being rotated against the clamping friction of the said clutch ring 500 further rotates the said clutch outer ramps 502 away from the said corresponding housing ramps 206 allowing the said clutch ring 500 to expand negating the grip of the said clutch ring 500 upon the said driven member drive surface 405 usefully allowing the said drive portion 400 or said shaft 416 to be said reversed or repositioned R.

The magnitude of the said clutch 500 engaging spring force is directionally proportionate to that of the said detent resilient portion 60, to that end the said clutch ring 500 generally requires to be thin in section and made from resilient material like high grade spring steel. The said ratchet wrench 1 is designed such that the clutch ring 500 forms the mid part of an extremely strong laminate like structure, under torque conditions the resultant compression forces applied to the clutch ring 500 are substantially dissipated around its said circumference 507. The resultant pseudo laminate like construction of the said drive 400, clutch 500 and housing 201, 202 enables a proportionately far stronger or alternately a thinner lighter device.

FIG. 20 is a perspective view of the said locking clutch further configured as a ratcheting wrench 11 incorporating a fastener engaging profile 418 within the drive element 400.

FIGS. 21,22 illustrate said drive element 400 incorporating a said ball 61, said spring 60 and ball retainer 63. FIG. 22 is a side view of the said locking clutch ratchet wrench 1 said drive element 400 incorporating the said ball 61, said spring 60 (not shown) and said ball retainer 63 within the said drive ball and spring bore 419, the said ball protruding from the profile of the drive outer surface 405, in use the said ball or balls 61 interact with the corresponding said notches 501 within the said clutch inner surface 508 to provide an audible indication of the ratcheting or repositioning R operation. The said ball retainer 63, further preventing the said ball 61 from protruding excessively from the said drive outer surface 508 whereas the said ball 61 could inadvertently jam between the opposing said clutch actuation faces 509.

The invention claimed is:

1. A locking clutch ratchet wrench comprising:
   a handle having opposing ends, a first said end received in a housing, said housing having an outer surface and an inner surface defining a housing aperture, said inner surface having a plurality of housing ramps;
   a clutch ring disposed in said housing aperture, said clutch ring having a first end having a first actuator face and a second end having a second actuator face, said clutch ring further having an outer surface and an inner surface that defines an aperture, said outer surface having a plurality of transmission ramps that engage said housing ramps and at least a portion of said inner surface having a plurality of gripping notches;
   said first end of the handle having an actuator that is disposed between said actuator faces of said clutch ring, and at least one biasing protrusion; and
   a drive element disposed in said clutch ring, said drive element having an outer surface and a spigot,
   wherein said first end of the handle is pivotally mounted to said housing and pivotable relative to said housing to cause said actuator to apply pressure to a said actuator face to cause said clutch ring to move relative to said housing about said drive element so that said transmission ramps move on said housing ramps to cause said clutch ring to clamp onto said drive element.

2. A locking clutch ratchet wrench as claimed in claim 1, wherein said gripping notches have a first and second edge, said edges clean debris from inside said housing.

3. A locking clutch ratchet wrench as claimed in claim 1, comprising a plurality of said biasing protrusions and wherein:
   said actuator has a first position and a second position,
   in said first position a first biaser engages a first said of said plurality of biasing protrusions to cause said actuator to act on said first actuator face of said clutch ring to pre-bias said transmission ramps against said housing ramps so that the wrench is configured to apply a drive torque to said drive element in a clockwise direction when said handle is pivoted relative to said housing in said clockwise direction to cause said actuator to apply said pressure to said first actuator face and to permit reverse rotation of said housing relative to said drive element in an anticlockwise direction when said handle is pivoted in an anticlockwise direction to release said pressure, and
   in said second position a second biaser engages a second of said plurality of biasing protrusions to cause said actuator to act on said second actuator face of said clutch ring to pre-bias said transmission ramps against said housing ramps so that said wrench head is configured to apply a drive torque to said workpiece in said anticlockwise direction when said handle is pivoted relative to said housing in said anticlockwise direction to apply said pressure to said second actuator face and to permit reverse rotation of said housing relative to said drive element in said clockwise direction when said handle is pivoted in said clockwise direction to release said pressure.

4. A locking clutch ratchet wrench as claimed in claim 3, wherein each said biaser comprises a ball and a spring acting on said ball.

5. A locking clutch ratchet wrench as claimed in claim 3, wherein said first and second biasers and the first and second biasing protrusions are configured to selectively retain said actuator in said first and second positions.

6. A locking clutch ratchet wrench as claimed in claim 1, wherein said housing ramps are disposed parallel to respective facing said transmission ramps for complementary engagement by relative sliding movement.

7. A locking clutch ratchet wrench as claimed in claim 1, wherein when said handle is pivoted to cause said actuator to apply said pressure, said gripping notches initially engage said drive element to cause said transmission ramps to move up said housing ramps to cause compression of said clutch ring upon said drive element.

8. A locking clutch ratchet wrench as claimed in claim 7, wherein when said handle is pivoted to release said pressure, said transmission ramps move down said housing ramps to allow said clutch ring to expand to cause said gripping notches to disengage said drive element.

9. A locking clutch ratchet wrench as claimed in claim 1, wherein said housing is comprises a top housing portion and a bottom housing portion and each of said top and bottom housing portions has housing closure protrusions and housing closure holes which interlock when said top and bottom housing portions are assembled.

10. A locking clutch ratchet wrench as claimed in claim 1, wherein said housing is provided with a seal channel and at least one seal situated within said seal channel.

11. A locking clutch ratchet wrench as claimed in claim 1, wherein said spigot is one of a ¼ inch square drive, a ⅜ inch square drive and a ½ inch square drive.

12. A locking clutch ratchet wrench as claimed in claim 1, wherein said spigot is a bit holder.

13. A locking clutch ratchet wrench as claimed in claim 1, wherein said housing ramps have a length in a circumferential direction of said drive element, said clutch transmission ramps have a length in said circumferential direction and said housing ramps and said clutch transmission ramps have a common ramp angle in said circumferential direction that is in the range eight to thirty degrees.

14. A locking clutch ratchet wrench as claimed in claim 1, having a ¼ inch square drive and said housing having a width of less than 17 mm.

15. A locking clutch ratchet wrench as claimed in claim 1, having a ⅜ inch square drive and said housing having a width of less than 20 mm.

16. A locking clutch ratchet wrench as claimed in claim 1, having a ½ inch square drive and said housing having a width of less than 25 mm.

17. A locking clutch ratchet wrench as claimed in claim 3, wherein said outer surface of said drive element has at least one spring and ball bore which receives a spring and ball which are retained in said bore by a ball container and a part of said ball protrudes from said ball container.

18. A locking clutch ratchet wrench as claimed in claim 17, wherein said part of said ball creates an audible indication as it interacts with said gripping notches when said handle is pivoted relative to said housing to cause said actuator to release said pressure.

19. A locking clutch ratchet wrench: a handle having opposing ends, a first said end connected with a housing, said housing having a switch recess, an outer surface and an inner surface that defines a housing aperture, said inner surface having a plurality of housing ramps; a clutch ring disposed in said housing aperture, said clutch ring having a first end having a first actuator face and a second end having a second actuator face, said clutch ring having an outer surface and an inner surface that defines an aperture, said outer surface of said clutch ring having a plurality of transmission ramps, and at least a portion of said inner surface of said clutch ring being smooth; a switch situated within said switch recess, said switch having an actuator situated between said actuator faces of said clutch ring, and at least one biasing protrusion; and a drive element disposed in said clutch ring, said drive element having an outer surface and a spigot, at least a portion of said outer surface having gripping notches, wherein said switch is pivotable relative to said housing to cause said actuator to apply pressure to a said actuator face to cause said clutch ring to move about said drive element so that said transmission ramps move on said housing ramps to cause said clutch ring to clamp onto said drive element.

\* \* \* \* \*